US008222756B2

(12) United States Patent
Koeneman et al.

(10) Patent No.: US 8,222,756 B2
(45) Date of Patent: Jul. 17, 2012

(54) POWER GENERATION SYSTEMS

(75) Inventors: Douglas Alan Koeneman, Carmel, IN (US); Edward Woods, Laramie, WY (US)

(73) Assignee: Powersys, LLC, Carmel, IN (US)

( * ) Notice: Subject to any disclaimer, the term of this patent is extended or adjusted under 35 U.S.C. 154(b) by 0 days.

(21) Appl. No.: 13/170,108

(22) Filed: Jun. 27, 2011

(65) Prior Publication Data

US 2011/0257805 A1 Oct. 20, 2011

Related U.S. Application Data

(63) Continuation of application No. 12/719,726, filed on Mar. 8, 2010, now Pat. No. 7,969,030, which is a continuation of application No. 10/577,577, filed as application No. PCT/US2004/032857 on Oct. 5, 2004, now Pat. No. 7,675,187.

(60) Provisional application No. 60/508,857, filed on Oct. 6, 2003.

(51) Int. Cl.
  *F02D 29/06* (2006.01)
  *H02P 9/00* (2006.01)
(52) U.S. Cl. .......................... 290/40 C; 290/1 A; 322/44
(58) Field of Classification Search .................. 290/1 A, 290/7, 40 C, 40 B; 322/37, 44
See application file for complete search history.

(56) References Cited

U.S. PATENT DOCUMENTS

| | | | |
|---|---|---|---|
| 3,805,082 A | 4/1974 | Murray | |
| 4,164,660 A | 8/1979 | Palazzetti | |
| 4,441,028 A | 4/1984 | Lundberg | |
| 4,548,164 A | 10/1985 | Ylonen et al. | |
| 4,622,924 A | 11/1986 | Lewis | |
| 4,657,290 A | 4/1987 | Linden | |
| 4,686,378 A | 8/1987 | Sisk | |
| 4,736,111 A | 4/1988 | Linden | |
| 4,831,277 A | 5/1989 | Christopher | |
| 5,323,061 A | 6/1994 | Immler | |
| 5,584,185 A | 12/1996 | Rumble et al. | |
| 5,649,418 A | 7/1997 | Ludwig | |
| 5,719,990 A | 2/1998 | Yang | |
| 5,798,586 A | 8/1998 | Adachi | |
| 6,525,431 B1 | 2/2003 | Clucas et al. | |
| 6,532,911 B2 | 3/2003 | Suzuki et al. | |
| 6,661,107 B2 | 12/2003 | Higuchi et al. | |
| 6,899,162 B2 | 5/2005 | Hohl et al. | |
| 6,972,955 B2 | 12/2005 | Pleskach et al. | |
| 6,978,772 B1 | 12/2005 | Dorn et al. | |
| 7,049,707 B2 * | 5/2006 | Wurtele | 290/1 B |
| 7,466,034 B2 * | 12/2008 | Kang et al. | 290/40 C |
| 7,675,187 B2 * | 3/2010 | Woods et al. | 290/1 A |
| 7,687,929 B2 * | 3/2010 | Fattal | 290/40 C |
| 7,969,030 B2 * | 6/2011 | Woods et al. | 290/1 A |
| 2002/0117935 A1 | 8/2002 | Kanazawa et al. | |
| 2002/0121780 A1 | 9/2002 | Westerbeke | |

(Continued)

FOREIGN PATENT DOCUMENTS

DE    10047222    4/2002

(Continued)

*Primary Examiner* — Nicholas Ponomarenko
(74) *Attorney, Agent, or Firm* — Wells St. John, PS

(57) ABSTRACT

A power generation system is provided that includes an internal combustion engine configured to provide rotational mechanical energy. A generator is configured to receive the rotational mechanical energy and generate electrical power in response to the rotational mechanical energy. A fluid medium is provided to the internal combustion engine and to the generator for removing thermal energy from the internal combustion engine and from the generator.

20 Claims, 23 Drawing Sheets

U.S. PATENT DOCUMENTS

2002/0124997 A1   9/2002   Blome

FOREIGN PATENT DOCUMENTS

| | | |
|---|---|---|
| DE | 10134678 | 2/2003 |
| EP | 0268726 | 6/1988 |
| EP | 0298164 | 1/1989 |
| FR | 2369426 | 5/1978 |
| JP | 63189621 | 8/1988 |
| JP | 06058143 | 3/1994 |
| JP | 6058143 | 3/1994 |
| JP | 2003018793 | 1/2003 |
| WO | WO 02/065620 | 8/2002 |
| WO | PCT/US04/032857 | 3/2006 |
| WO | PCT/US04/032857 | 4/2006 |

* cited by examiner

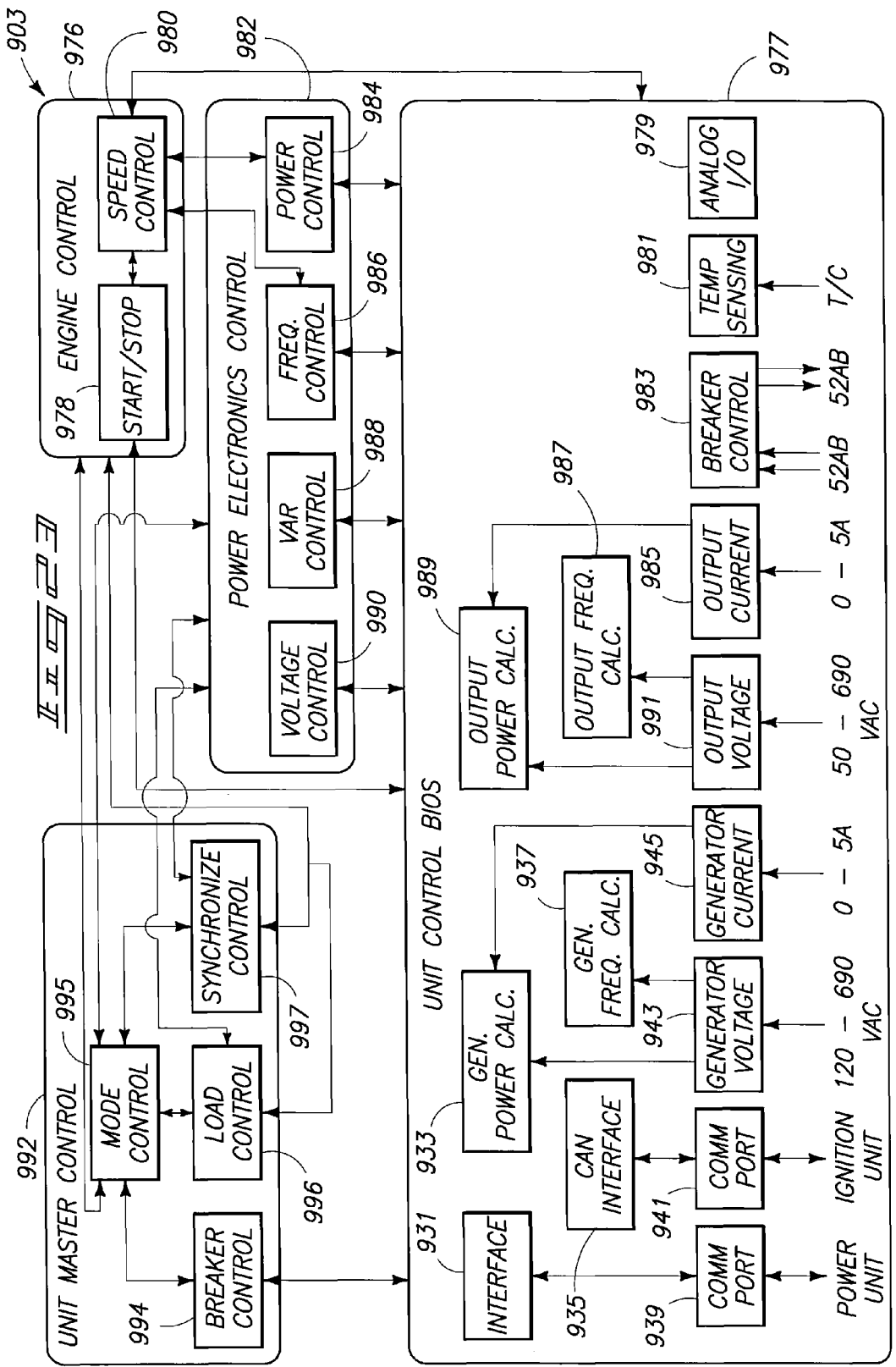

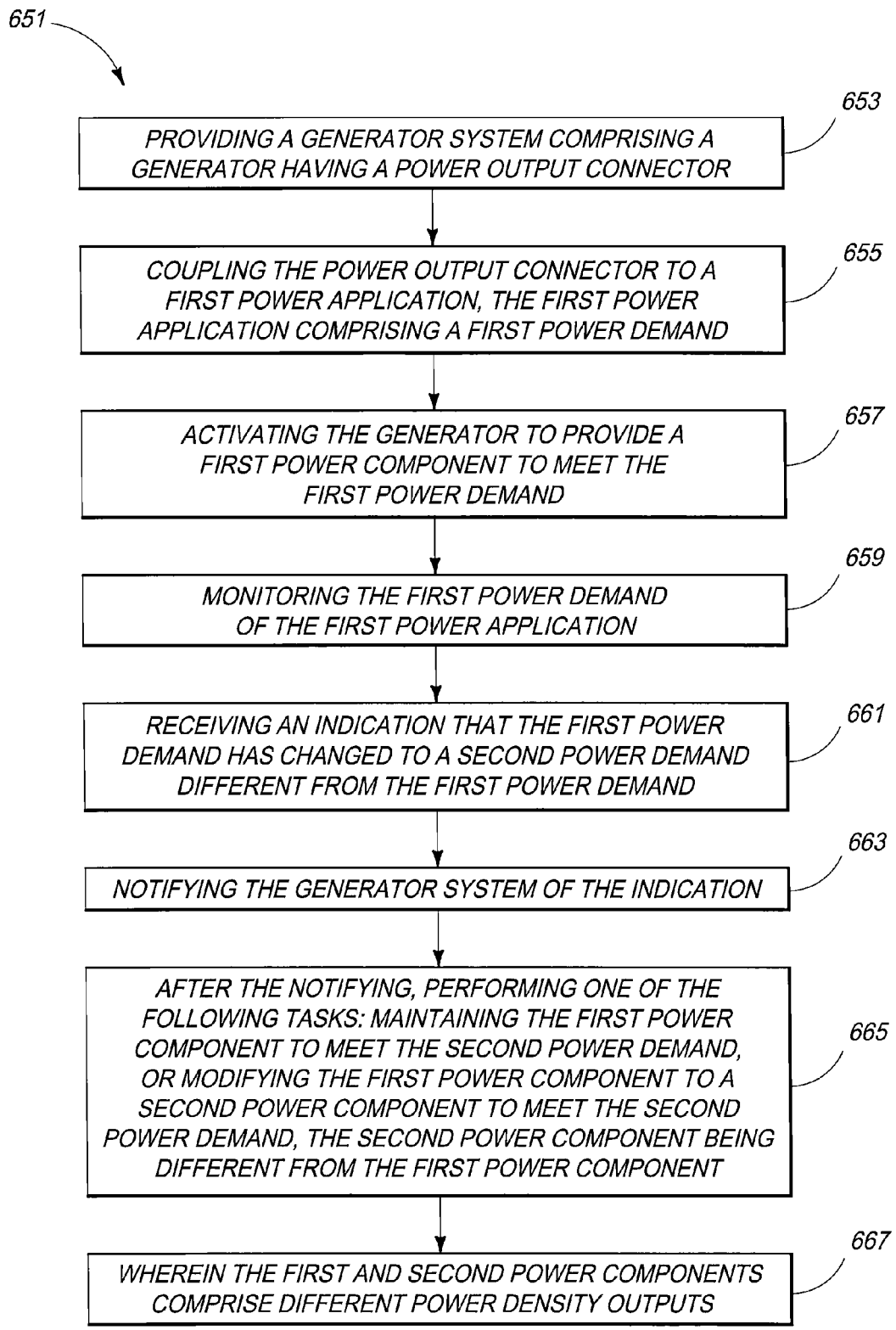

POWER GENERATION SYSTEMS

CROSS REFERENCE TO RELATED APPLICATION

This patent resulted from a continuation application of U.S. patent application Ser. No. 12/719,726, filed Mar. 8, 2010, now issued U.S. Pat. No. 7,969,030 dated Jun. 28, 2011, of which was a continuation application of, and claims priority to U.S. patent application Ser. No. 10/577,577, filed Sep. 21, 2006, now issued U.S. Pat. No. 7,675,187 dated Mar. 9, 2010, which claims priority to PCT International Application Number PCT/US04/32857, filed Oct. 5, 2004, published in English, and which claims priority to U.S. Provisional Patent Application No. 60/508,857, filed Oct. 6, 2003, and the teachings of all the applications are incorporated herein by reference.

TECHNICAL FIELD

The present invention relates to power generation systems and methods of generating power.

BACKGROUND ART

The current products offered by the portable power generation industry are deficient in meeting customer needs. For example, current portable generator sets are limited to single voltages at a designed output frequency, that is, the generator sets operate at fixed revolutions per minute (rpms) which is limiting the usefulness of current portable power generation systems. To handle the needs of customers that operate in a global environment, portable generator sets are either reconfigured after purchase, or multiple portable generator sets are purchased that operate with different respective frequencies and voltages. Portable power generation systems are needed to resolve these issues and more readily meet the needs of customers.

Moreover, the portable power generation industry continues to strive to meet customer demands for products that are light in weight, small in size (including footprint dimensions) and fuel efficient. For example, a conventional generator set (gen set) comprises a longitudinal or length-wise dimension of approximately sixty inches without a heat exchanger and weighs approximately 2,000 pounds.

Furthermore, the portable power generation industry continues to strive to meet the needs of customers that use generators and generator sets as auxiliary power units (APUs). For example, improvements are needed for auxiliary power units used in the trucking business such as the tractor trailer and/or long haul trucking industry. As environmental concerns result in more stringent noise and air emission regulations, truck operators are continually being prevented from operating their engines in more areas, for example, truck stops, loading docks and rest areas due to emission regulations and no-idle laws. This translates into the truck operator being prevented from operating modern conveniences such as an on-board air conditioner, refrigerator, radio and/or television. It also translates into the truck operator not being able to perform business tasks that are work-related which require an on-board computer. Portable power generation systems are needed as solutions to resolve these issues and respond to market and regulatory pressures in the trucking industry. Additionally, the portable power generation industry continues to strive to meet the demands of truck drivers for APUs that ensure that parasitic loads of a truck engine are maintained at a minimum.

Still further, the transportation industry continues to strive to produce fuel efficient and environmentally-friendly vehicles. This motivation as led to alternative power generation designs and technologies for the vehicles, such as electric vehicles and hybrid electric vehicles. These vehicular designs have unique power applications and demands wherein a power plant provides battery charging, power for peak load requirements, absorption of braking energy and power for prime loads. Important design considerations and parameters for the power plants are size and weight because such parameters drive the load and physical size of the vehicle. An additional design consideration should be reflected in a customer's need for systems capable of withstanding exposure of rain, dust or other external environmental conditions. A need exists for power generation systems designed to meet the unique considerations and parameters of electric vehicles and hybrid electric vehicles.

Additionally, conventional motor-generator systems or generator sets are used to transform power and/or isolate power from one source to another. The application typically involves the coupling of an AC motor which is coupled with an AC or DC radial gap generator to create DC power or a different voltage & frequency of AC power. There is a continual need to optimize the size, weight and cost of conventional motor-generator systems. This is especially true for military applications, for example the Navy branch and any industry dealing with boating, which require high tolerance parameters and specifications with regard to cooling, weight and space requirements for power generation. Thermodynamic management in these applications have proven difficult and very expensive. Accordingly, there is a need to provide a motor-generator system or set that resolves these problems of the conventional motor-generator systems.

SUMMARY

In one aspect of the invention, a power generation system is provided that includes an internal combustion engine configured to provide rotational mechanical energy. A generator is configured to receive the rotational mechanical energy and generate electrical power in response to the rotational mechanical energy. A fluid medium is provided to the internal combustion engine and to the generator for removing thermal energy from the internal combustion engine and from the generator.

BRIEF DESCRIPTION OF THE DRAWINGS

Preferred embodiments of the invention are described below with reference to the following accompanying drawings.

FIG. 23 is a block diagram of an other exemplary Unit Control/Logic Control according to embodiments of the invention.

FIG. 24 is a block diagram of an exemplary method for generating power according to one of various embodiments of the invention.

DETAILED DESCRIPTION OF THE PREFERRED EMBODIMENTS

Figure 1:
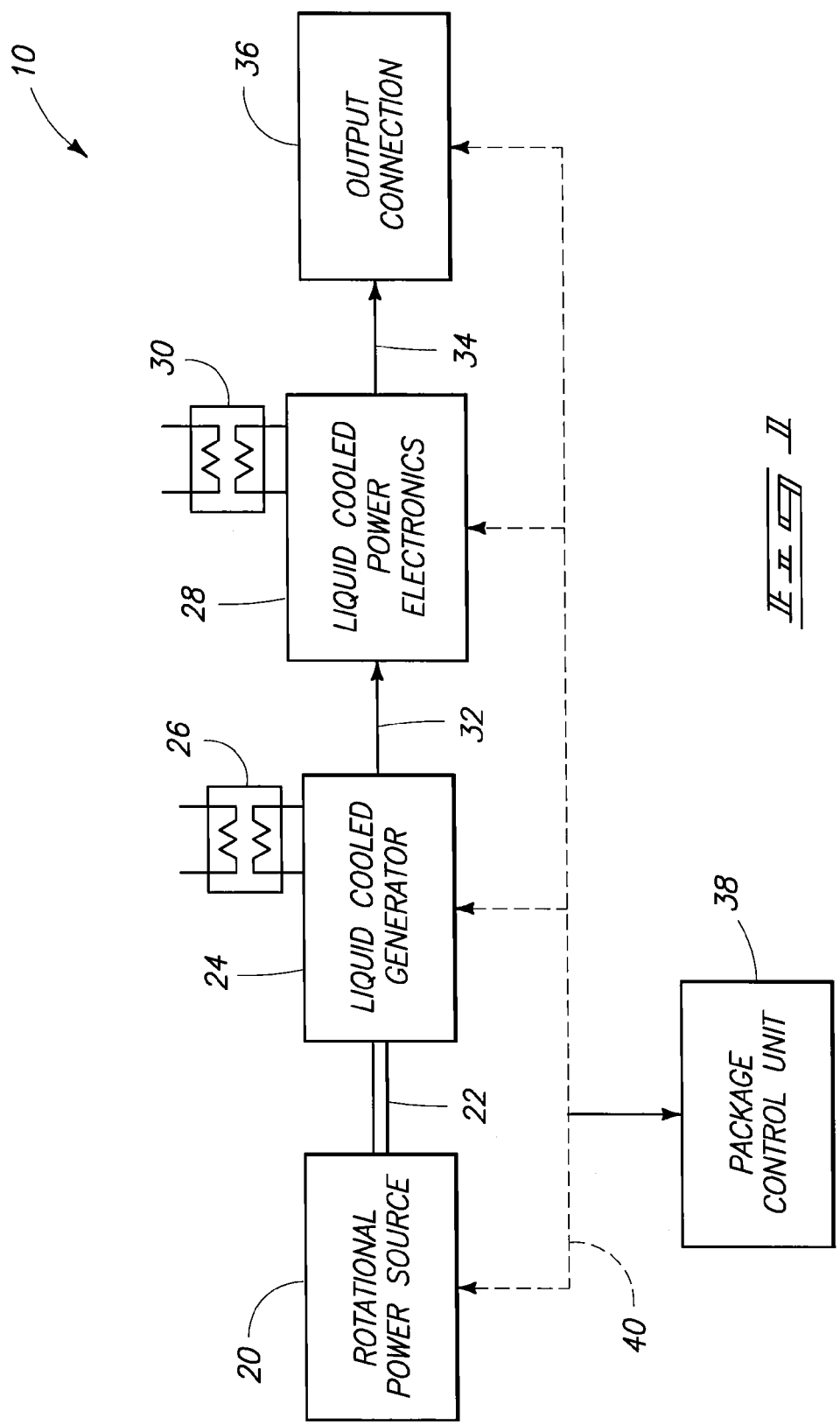
FIG. 1 is a block diagram of an exemplary power generation system according to embodiments of the invention.

Referring to FIG. 1, an overview of an exemplary embodiment of a power generation system 10 according to the invention is illustrated as a block diagram. An exemplary power generation system 10 includes a system for a generator and/or a generator set. In one exemplary embodiment of the power generation system 10, a rotational power source 20 has an output in the form of rotational mechanical energy provided by an output shaft 22 which rotates having a rotational speed in revolutions per minute (rpm). The rotational mechanical energy of rotating output shaft 22 is transferred to a generator 24 which converts the rotational mechanical energy of rotating output shaft 22 into electrical energy and thermal energy (i.e., electricity and heat, respectively). Electrical output of the generator 24 is in relation to the speed of the output shaft 22 of the rotational power source 20. Energy loss in the form of heat is incurred in the process of converting rotational mechanical energy into electrical energy. In one exemplary embodiment of system 10, generator 24 is coupled in fluid communication with a heat exchanger 26 wherein at least a portion of the thermal energy (i.e., heat) produced in generator 24 is transferred to a fluid medium, for example, air and/or a liquid which is provided to generator 24 via a fluid conduit (shown subsequently), for example, a hose or pipe between the generator 24 and heat exchanger. Additionally, portions of heat are transferred to outside surfaces of generator 24 from which the heat is transferred to the surrounding air or environment. In some embodiments, the power generation system includes a heat exchanger 26. In some embodiments, heat exchanger 26 or cooler is included within an array or network of heat exchanger units. An exemplary array or network is coupled in heat exchanging relation to fluid using a fluid conduit, for example, a hose or tube.

Still referring to FIG. 1, the generator 24 is coupled, using interface 32, with a power electronics device 28, or power conversion device. Electricity produced by the generator 24 is transferred to the power electronics device 28 to be converted into a form desired by the operator of the power generation system 10. In one embodiment of system 10, thermal energy generated by a power electronics device 28 is at least partially removed by a fluid, for example, by air and/or a liquid. In some embodiments of system 10, thermal energy generated by a power electronics device 28 is at least partially removed by a liquid. The power electronics device 28 comprises a heat exchanger 30 coupled in fluid communication with a heat exchanger 30 by a liquid cooling circuit (illustrated more thoroughly subsequently). Heat produced in the process of converting the generated electricity into a form that is selected by the operator is transferred to the liquid cooling circuit from the power electronics device 28 and to a heat exchanger 30. Heat from the heat exchanger 30 is transferred to the environment and/or another medium. In some embodiments of system 10, the heat exchanger 30 comprises an independent unit. In other embodiments of system 10, the heat exchanger 30 is combined within a network of at least one other heat exchanger unit, for example, a network that includes heat exchanger 26. A power electronics device 28 is capable of power conversions or signal conversions from an input source to an output source, for example, from AC to DC, DC to AC, and AC to AC. The power electronics device 28 is capable of one or a multiple of the aforementioned conversions. In some embodiments of power generation system 10, an operator is able to configure, reconfigure and/or modify the power electronics device 28 such that output current, frequency, voltage and/or polarity are selectable.

Still referring to FIG. 1, the power electronics device 28 is coupled to output connection(s) 36. Converted electricity having the selected output current, frequency, voltage and/or polarity is transferred to the output connection(s) 36. In some embodiments, the output connection 36 is an integral component of the power electronics device 28. In other embodiments, the output connection 36 comprises a stand-alone component connected to the power electronics device 28 by an interface 34. The output connection 36 provides an interface between the power generation system 10 and an electrical load (not shown).

Still referring to FIG. 1, an exemplary power generation system 10 comprises a control unit 38 that monitors the respective components and devices discussed previously, for example, rotational power source 20, generator 24, power electronics device 28 and output connection 36, respectively. An array 40 of data conduits are coupled between the package control unit 38 and the respective devices to communicate input and output data between the respective devices. The exemplary control unit 38 has the capability to perform one or more of the following functions: monitor the power generation system 10, diagnose problems within the power generation system 10, control components of the power generation system 10, annunciate status of components of the power generation system 10, and supervise the power generation system 10. In some embodiments, the package control unit 38 may also function as an interface for local and/or remote monitoring and control.

It should be understood that various combinations of devices (e.g., rotational power source 20, generator 24, power electronics device 28 and output connection 36, respectively) can be coupled in fluid communication to various combinations of heat exchangers. For example, a power generation system 10 can comprise a single heat exchanger standing alone and coupled in fluid communication with a single device 20, 24, 28, 36. That is, a single heat exchanger can be coupled to a single device 20, 24, 28, 36. Alternatively, one or more heat exchangers can be coupled to a single device. For example, two or more heat exchangers can be coupled in fluid communication with generator 24, and the combination of heat exchangers can be in fluid communication with one another, or not in fluid communication with one another. Alternatively, one or more devices can be coupled to a single heat exchanger. For example, two or more devices, for example, rotational power source 20 and generator 24, can be coupled in fluid communication with a single heat exchanger 26, and the combination of devices can be in fluid communication with one another, or not in fluid communication with one another. Moreover, an exemplary power generation system 10 can include a single device 20, 24, 28, 36 coupled to a single heat exchanger and include another single device coupled to a plurality of heat exchangers. Additionally, an exemplary power generation system 10 can include a single device coupled to a single heat exchanger and include another single heat exchanger coupled to a plurality of devices. Furthermore, an exemplary power generation system 10 can include any combination of the examples presented above. For example, an exemplary power generation system 10 can include a plurality of devices coupled to a single heat exchanger or a plurality of heat exchangers; and include another single device coupled to another single heat exchanger; and include a plurality of heat exchangers coupled to another single device or coupled to another plurality of heat exchangers; and added to this exemplary power generation system 10 can include any additional combination of devices coupled to additional combination of heat exchangers.

Figure 2:
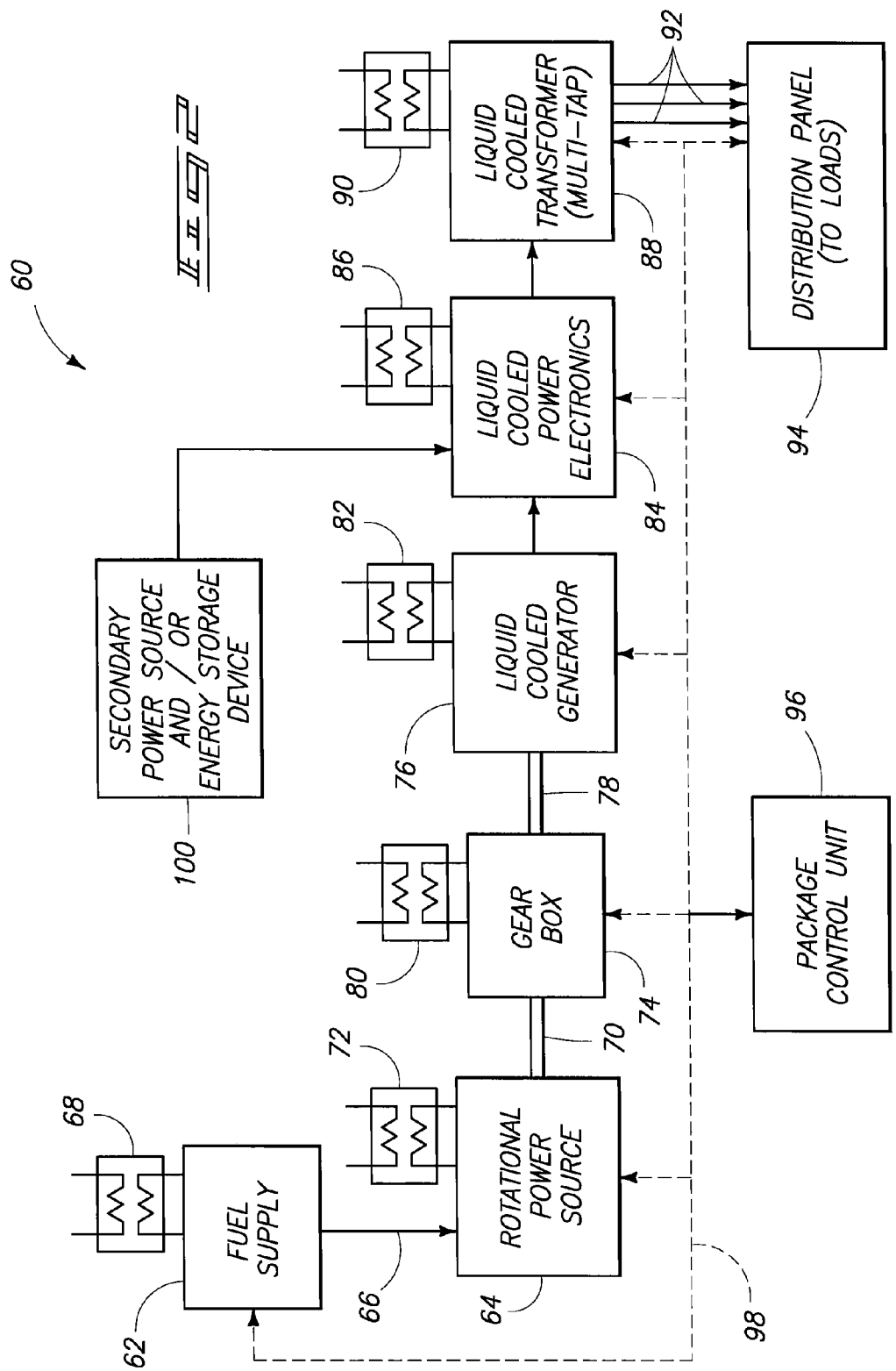
FIG. 2 is a block diagram of an exemplary power generation system according to other embodiments of the invention.

Referring to FIG. 2, an overview of another exemplary embodiment of a power generation system 60 is illustrated as a block diagram. Power generation system 60 includes a system for a generator and/or a generator set. In one exemplary embodiment of the power generation system 60, a fuel supply 62 provides chemical energy to a rotational power source 64 via a fuel conduit 66. In some embodiments, fuel supply 62 is cooled by a fluid, for example, a liquid. In these embodiments, fuel supply 62 is coupled, for example, in fluid communication to a heat exchanger 68 to at least partially remove thermal energy from the fuel supply 62. An exemplary heat exchanger 68 defines an independent component of power generation system 60. In another embodiment, heat exchanger 68 is combined within a network of at least one other heat exchanger units. Rotational power source 64 comprises an output shaft 70 and converts chemical energy from fuel supply 62 into rotational mechanical energy at the output shaft 70. Rotational power source 64 is coupled in fluid communication with a heat exchanger 72. At least a portion of heat generated in converting chemical energy to rotating mechanical energy is transferred to a fluid medium, for example, a liquid provided to the rotational power source 64 via a cooling circuit. An exemplary heat exchanger 72 defines an independent component of power generation system 60. In other embodiments, heat exchanger 72 is combined within a network of at least one other heat exchanger unit, for example, heat exchanger 68.

Still referring to FIG. 2, the rotating output shaft 70 of rotational power source 64 is coupled to a gearbox 74 to transfer rotating mechanical energy from the rotational power source 64 to the gearbox 74. The gearbox 74 comprises an output shaft or drive shaft 78 that is coupled to a generator 76. The shaft 78 transfers rotational mechanical energy of output shaft 70 from rotational power source 64 to the drive shaft 78 which drives generator 76. An exemplary gearbox 74 is configured to selectively increase or decrease the rotating speed of output shaft 70 of rotational power source 64 which corresponds to selectively increasing or decreasing the rotating speed of drive shaft 78 which corresponds to selectively increasing or decreasing the rotating speed of generator 76. Such exemplary selectivity of gearbox 74 ensures generator 76 operates at an optimal speed. Thermal energy is generated within the gearbox 74 during the conversion of increasing or decreasing rotational speed of the output shaft 70 to drive shaft 78. In one exemplary embodiment, drive shaft 78 is coupled in fluid communication with a heat exchanger 80 wherein at least a portion of heat generated in converting the rotating mechanical energy of respective shafts 70 and 78 is transferred to a fluid medium, for example, air and/or a liquid which is provided to the gearbox 74 via a conduit, for example, a hose or pipe (shown subsequently). An exemplary heat exchanger 80 defines an independent component of power generation system 60. In other embodiments, heat exchanger 80 is combined within an array or network of at least one other heat exchanger unit, for example, with heat exchanger 68 or with heat exchanger 72, or with both. An exemplary array or network is coupled in fluid communication by an exemplary conduit, for example, a hose or tube.

The generator 76 converts rotating mechanical energy into electrical energy and thermal energy (i.e., electricity and heat). In one exemplary embodiment, generator 76 is coupled in fluid communication with a heat exchanger 82 wherein at least a portion of heat generated in the process of converting mechanical energy into electricity is transferred to a fluid medium, for example, air and/or a liquid which is provided to the generator 76 via a conduit, for example, a hose or pipe (shown subsequently). An exemplary heat exchanger 82 defines an independent component of power generation system 60. In another embodiment, heat exchanger 82 is combined within an array or network of at least one other heat exchanger unit, for example, with heat exchanger 68 or with heat exchanger 72, or with both. An exemplary array or network is coupled in fluid communication by an exemplary conduit, for example, a hose or tube.

Electricity produced by the generator 76 is transferred to a power electronics device or power conversion device 84. Electricity produced by the generator 76 is transferred to the power electronics device 84 to be converted into one or more forms as desired by the operator of the power generation system 60. In one exemplary embodiment, power electronics device 84 is coupled in fluid communication with a heat exchanger 86 wherein at least a portion of heat generated in the process of converting one form of electricity to another form of electricity is transferred to a fluid medium, for example, air and/or a liquid which is provided to the power electronics device 84 via a conduit, for example, a hose or pipe (shown subsequently). An exemplary heat exchanger 86 defines an independent component of power generation system 60. In another embodiment, heat exchanger 86 is combined within an array or network of at least one or more heat exchanger units, for example, with heat exchanger 68, 72, 80, and/or 82, singularly or in any combination thereof. An exemplary array or network is coupled in fluid communication by an exemplary conduit, for example, a hose or tube. In an exemplary embodiment, the power electronics device 84 has the capability to interface with a secondary power source 100. The secondary power source 100 is capable of providing a secondary power input to the power electronics device 84 via an interface and/or receiving power from the power electronics device 84 for distribution or storage. Exemplary devices for exemplary secondary power source 100 include another generator, utility feed, flywheel energy storage device, batteries, capacitors (super) or other energy sources. An exemplary power electronics device 84 will manage various combinations of electrical current for example:

| Primary input | Secondary input | Output |
|---|---|---|
| AC | — | AC* |
| AC | AC | AC* |
| AC | DC | AC* |
| AC |  | DC* |
| AC | AC | DC* |
| AC | DC | AC* |
| DC |  | AC* |
| DC | AC | AC* |
| DC | DC | AC* |
| DC |  | AC* |
| DC | AC | DC* |
| DC | DC | DC* |

*Capable of one or a multiple of the outputs.

An exemplary power electronics device 84 provides an output that is frequency selectable, voltage selectable, and polarity selectable. An exemplary power electronics device 84 provides an output that includes digital grade power. An exemplary power generation system 60 comprises an output of the power electronics device 84 that is transferred to transformer 88 via an interface. An exemplary power generation system 60 comprises an exemplary transformer 88 coupled to a distribution panel 94 via an interface 92 wherein the distribution panel 94 is coupled to power loads to be used by a consumer. In one exemplary embodiment, an exemplary transformer 88 is coupled in fluid communication with a heat exchanger 90 wherein at least a portion of heat generated in the transformer 88 is transferred to a fluid medium, for example, air and/or a liquid which is provided to the transformer 88 via a conduit, for example, a hose or pipe (shown subsequently). An exemplary heat exchanger 90 defines an independent component of power generation system 60. In another embodiment, heat exchanger 90 is combined within an array or network of at least one or more heat exchanger units, for example, with heat exchanger 68, 72, 80, 82 and/or 86, singularly or in any combination thereof. An exemplary array or network is coupled in fluid communication by an exemplary conduit, for example, a hose or tube.

Still referring to FIG. 2, power generation system 60 comprises a package control unit 96 that monitors the respective components and devices discussed previously, for example, fuel supply 62, rotational power source 64, gearbox 74, generator 76, power electronics device 84, transformer 88 and distribution panel 94, respectively. An array 98 of data conduits are coupled from the power electronics device 84 to the respective devices to communicate input and output data between the respective devices and the power electronics device 84. The exemplary package control unit 96 has the capability to perform one or more of the following: monitor components of the power generation system 60, diagnose problems with components of the power generation system 60, control components of the power generation system 60, annunciate status information relating to components of the power generation system, and supervise the power generation system 60. In another exemplary embodiment, the package control unit 96 may also function as an interface for local and/or remote monitoring and control.

It should be understood that the plurality of various combinations of devices (e.g., fuel supply 62, rotational power source 64, gearbox 74, generator 76, power electronics device 84, transformer 88, respectively) can be coupled in fluid communication to the following plurality of various combinations of heat exchangers for an exemplary power generation system 60. For example, an exemplary power generation system 60 can comprise a single heat exchanger standing alone and coupled in fluid communication with a single device. That is, a single heat exchanger can be coupled to a single device. Alternatively, one or more heat exchangers can be coupled to a single device. For example, two or more heat exchangers can be coupled in fluid communication with generator 76, and the combination of heat exchangers can be in fluid communication with one another, or not in fluid communication with one another. Alternatively, one or more devices can be coupled to a single heat exchanger. For example, two or more devices, for example, rotational power source 64 and generator 76, can be coupled in fluid communication with a single heat exchanger, and the combination of devices can be in fluid communication with one another, or not in fluid communication with one another. Moreover, an exemplary power generation system 60 can include a single device coupled to a single heat exchanger and include another single device coupled to a plurality of heat exchangers. Additionally, an exemplary power generation system 60 can include a single device coupled to a single heat exchanger and include another single heat exchanger coupled to a plurality of devices. Furthermore, an exemplary power generation system 60 can include any combination of the examples presented above. For example, an exemplary power generation system 60 can include a plurality of devices coupled to a single heat exchanger or a plurality of heat exchangers; and include another single device coupled to another single heat exchanger; and include a plurality of heat exchangers coupled to another single device or coupled to another plurality of heat exchangers; and added to this exemplary power generation system 60 can include any additional combination of devices coupled to additional combination of heat exchangers.

Referring to FIGS. 3-11, an exemplary embodiment of a power generation system 200 is illustrated. Components of an exemplary embodiment of a power generation system 200 are illustrated in FIGS. 12-18. It should be understood that power generation system 200 can be used for the power generation systems discussed above with respect to FIGS. 1 and 2. It should also be understood that the specific components of FIGS. 12-18 and schematics presented in FIGS. 20-24 can be used for the power generation systems discussed above with respect to FIGS. 1-2 and power generation system 200. It should be understood that FIG. 19 illustrates another exemplary power generation system 840 that can be used for the power generation systems discussed above with respect to FIGS. 1 and 2, and include the specific components of FIGS. 12-18 and include the schematics presented in FIGS. 20-24.

Power generation system 200 comprises a rotational power source 208, for example, an internal combustion engine, such as a gasoline engine or a diesel engine. In one exemplary embodiment, the rotational power source comprises a diesel engine 208. An exemplary diesel engine 208 is designed with an optimal gear train (not shown) within the engine by having a front gear train of two high-contact-ratio gears mounted to the engine block and has the added benefit of low noise characteristics. An exemplary diesel engine 208 includes a fuel system that has mechanically governed unit pumps (not shown) mounted inside the engine block which eliminates external high-pressure lines, minimizes leak paths and reduces noise levels. This fuel system contributes to cost effectiveness and clean design. One example of a diesel engine that could be employed for the diesel engine 208 is an industrial engine that is commercially available from John Deere as model 4024T 66 hp Diesel Engine (www.deere.com).

Figure 3:
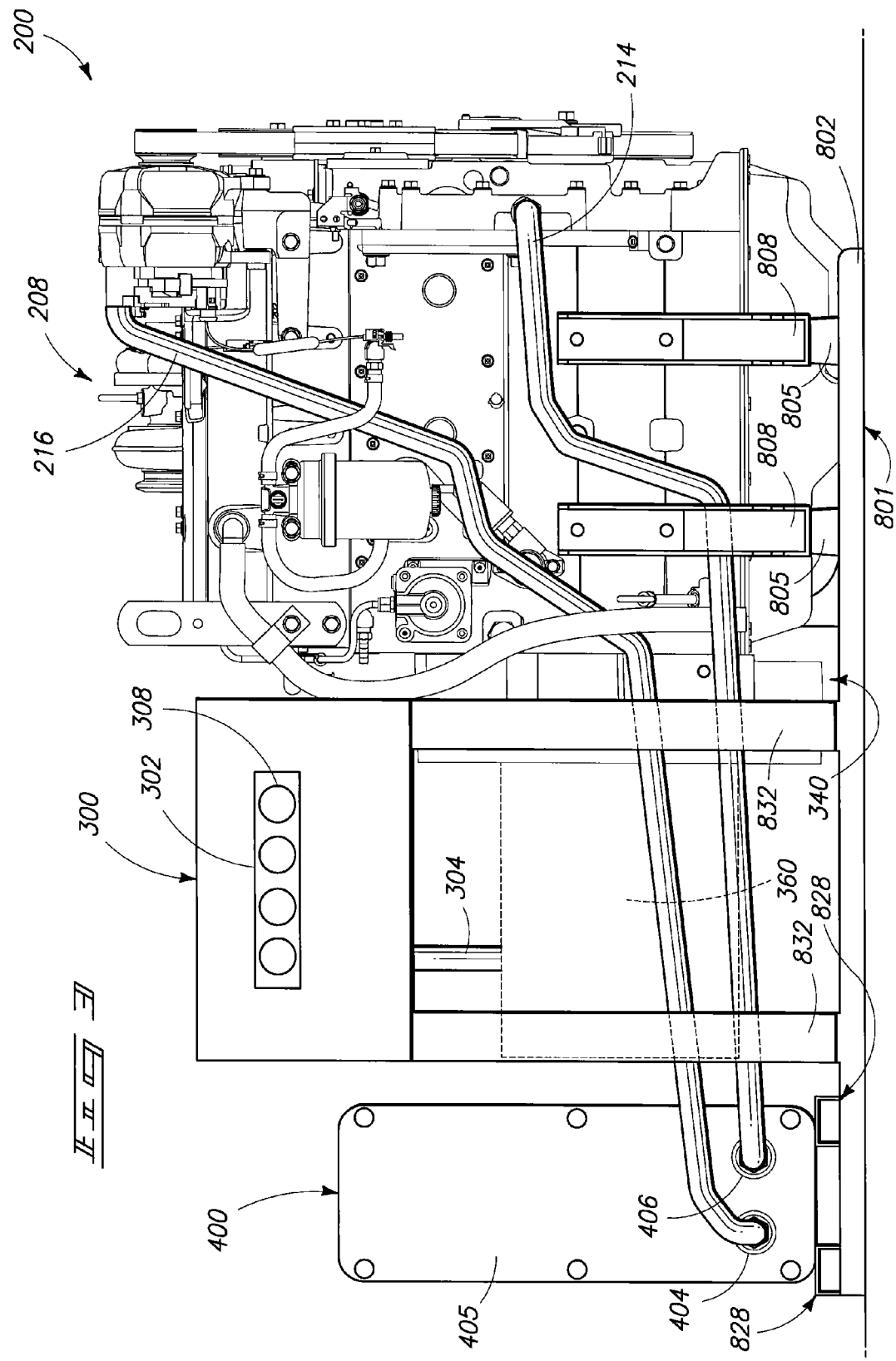
FIG. 3 is a side elevational view of an exemplary power generation system according to an embodiment of the invention.

The diesel engine 208 has an output providing rotational mechanical energy in the form of an output shaft (not shown) which is rotatable and is coupled to a rotational coupling device which couples engine 208 to a generator (only generator housing 360 shown in FIG. 3). An exemplary rotational coupling device comprises a flywheel which provides the rotational mechanical energy of rotating output shaft to the generator for conversion into electrical and thermal energy (i.e., electricity and heat, respectively). An example of a flywheel that could be employed for the flywheel 600 illustrated in FIG. 13 (only flywheel housing 340 is shown in FIG. 3) is commercially available from ARCUSAFLEX® Flywheel Couplings as model Ringfeder Arcusaflex Coupling (www.ringfeder.com).

Figure 12:
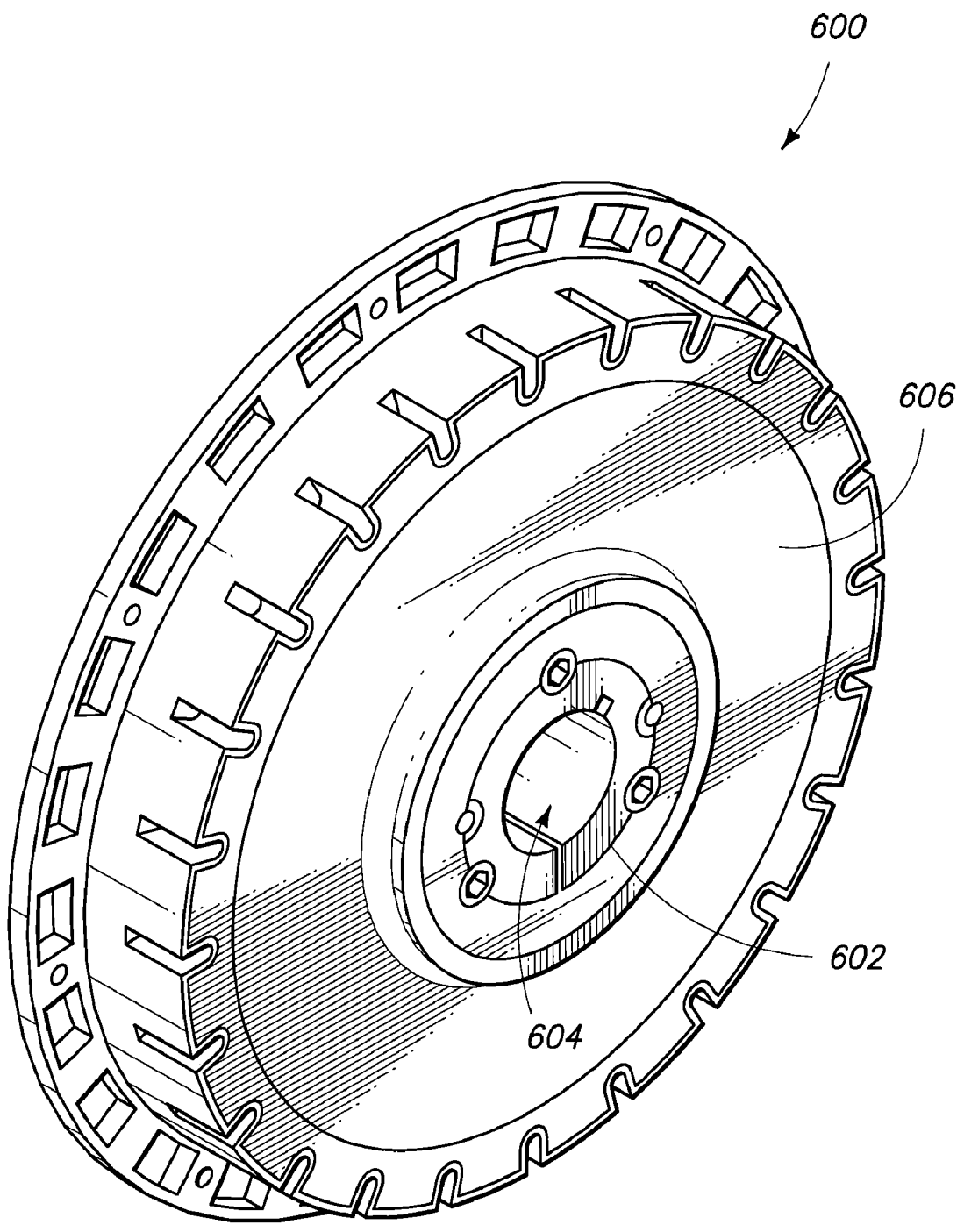
FIG. 12 is a perspective view of an exemplary flywheel according to an embodiment of the invention.

Referring to FIG. 12, an exemplary flywheel 600 comprises a coupling ring 602 which forms a cylindrical opening 604 to receive the shaft of the generator which provides the coupling of the flywheel 600 to the generator. In one embodiment, an exemplary flywheel 600 comprises a rubber disk component 606 which permits the shaft of the generator to be provided at angular, axial and parallel misalignments and also dampens vibrations.

Figure 13:
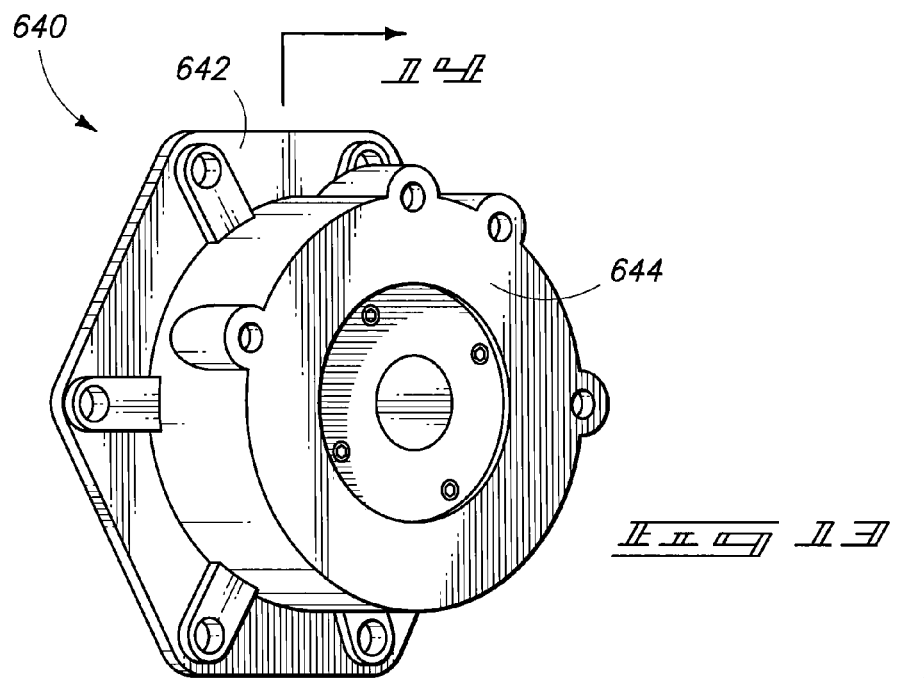
FIG. 13 is a perspective view of an exemplary generator according to an embodiment of the invention.
Figure 14:
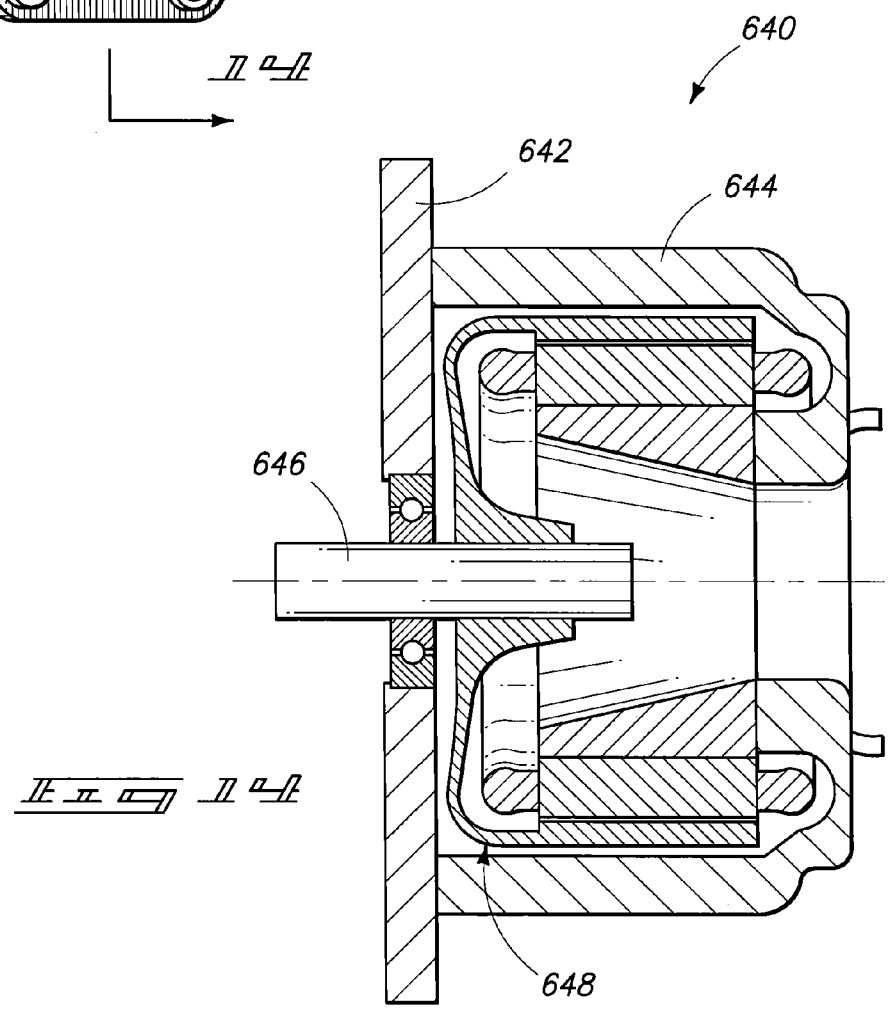
FIG. 14 is a sectional view of the FIG. 13 generator.

Referring to FIGS. 13-14, an exemplary generator 640 is illustrated (only generator housing 360 is shown in FIG. 3) and comprises a flange portion 642 for securing generator 640 to a structure or component of power generation system 200 (FIG. 3). An exemplary generator 640 comprises a housing 644 integral with flange portion 642 for protecting and enclosing the internal structure and components 648 of generator 640. Referring to FIG. 3, an exemplary generator housing 360 seals and protects generator 640 from the environment and can withstand water and sand exposure. An example of a generator that could be employed for the generator 640 is commercially available by TM4 Energy as model TM4 40 kw generator.

Referring to FIG. 3, an exemplary power electronics device 300 is illustrated positioned elevationally above generator housing 360. It should be understood that power electronics device 300 could be positioned in any location relative the other components of power generation system 200. Power electronics device 300 comprises an array 302 of output connections 308. Output connections 308 comprise electrical ports to be used by the consumer for connection to loads permitting the consumer to use the electrical energy produced by the generator. An exemplary power electronics device 300 is a power conversion device that converts the output of the generator (AC or DC) into a useable voltage (AC or DC) and frequency (50 Hz, 60 Hz, etc.). The exemplary power electronics device 300 is sealed from the environment and can withstand water immersion and survive up to 50 g repetitive shock (vibration) loads. Components of the power electronics device 300 are mounted on a hollow plate wherein fluid (coolant) from an heat exchanger passes through the hollow portion of the plate to remove heat from the power electronics device 300 generated in the power conversion process (loss due to inefficiencies). In one embodiment, the power electronics device 300 is integrated into the generator housing 360, or be an independent component that is mounted on the frame (discussed more thoroughly subsequently). An exemplary power electronics device 300 comprises a size that ranges from five times to ten times less than the size of a conventional power electronics device.

Figure 16:
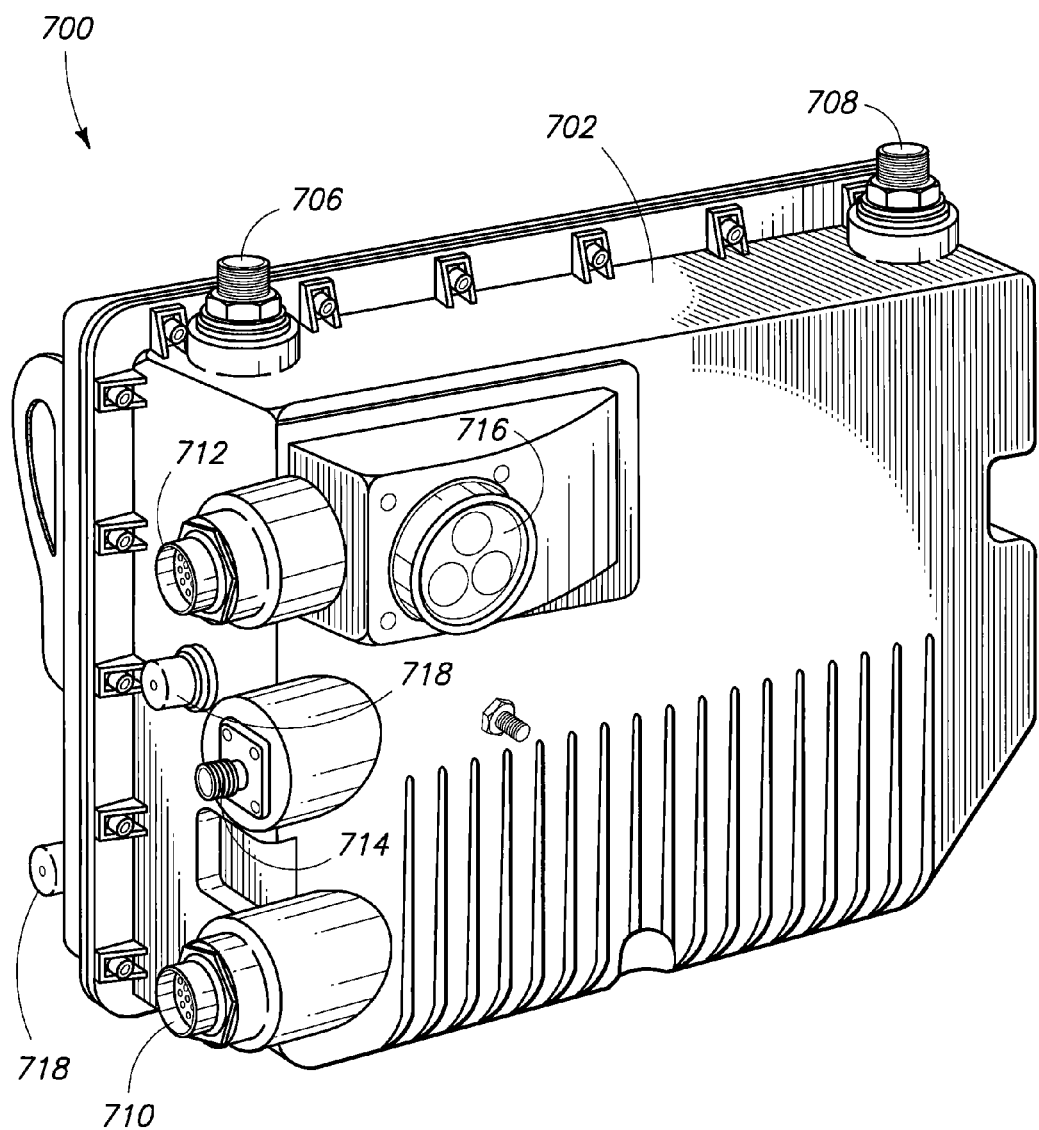
FIG. 16 is a perspective side view of an exemplary power electronics device according to an embodiment of the invention.
Figure 17:
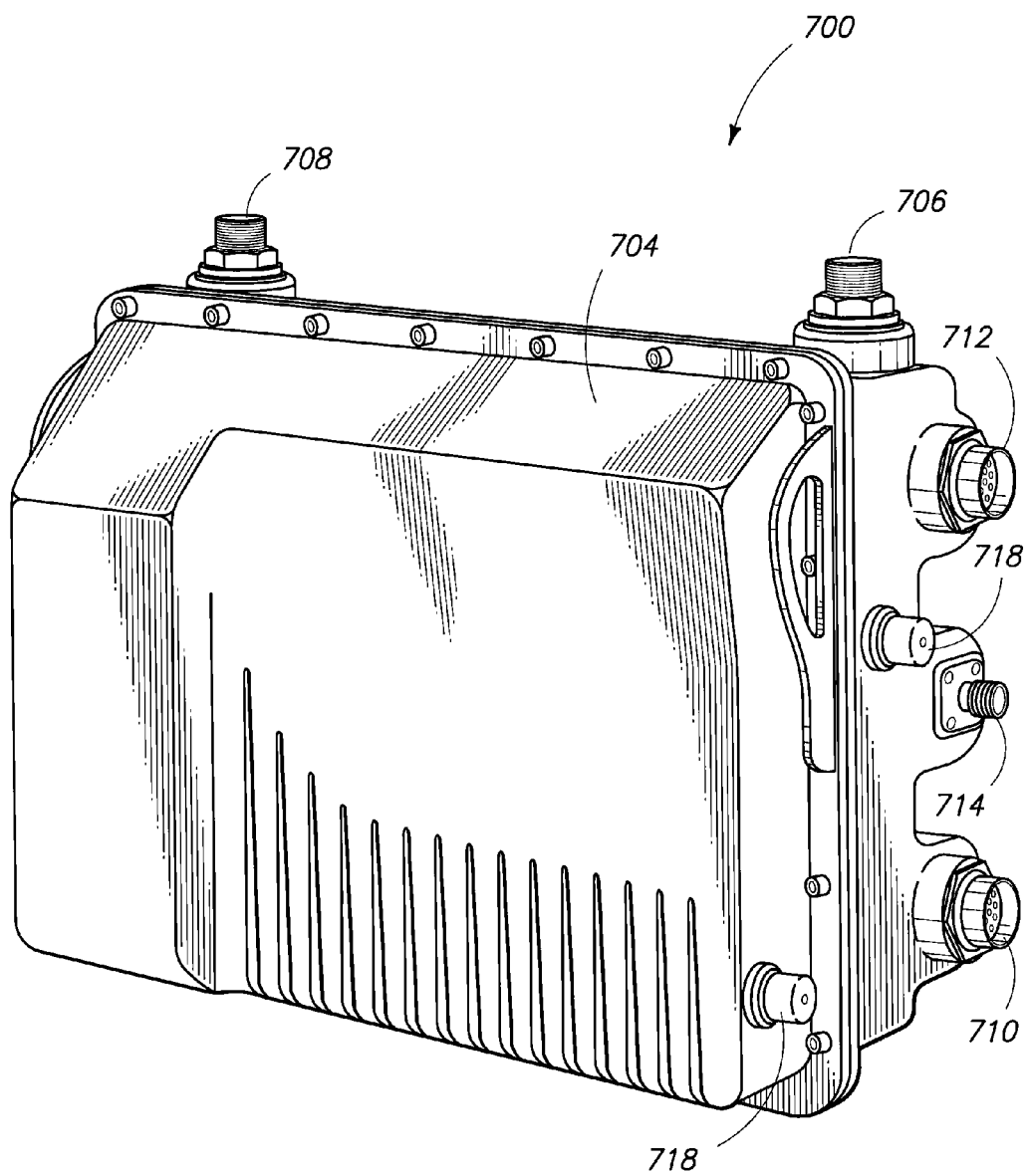
FIG. 17 is a perspective side view of the FIG. 16 power electronics device illustrating a side view opposite the side view of FIG. 16.

Referring to FIGS. 16-17, an exemplary power electronics device 700 is illustrated in more detail. Power electronics device 700 comprises cooling ports 706 and 708 for coupling to an exemplary heat exchanger for fluid transport. Power electronics device 700 further comprises electrical connections/ports 716 and communication ports 710 and 712. An exemplary power electronics device 700 comprises a resistance temperature device (RTD) 714 and center-of-gravity mounts 718 to impede shock and vibrations to the power electronics device 700. Housing portions 702 and 704 protect and enclose structure within power electronics device 700. An example of a power electronics device that could be employed for the power electronics device 700 is commercially available from Rockwell Automation as model LiquiFlo ProPulse Power Module.

Figure 7:
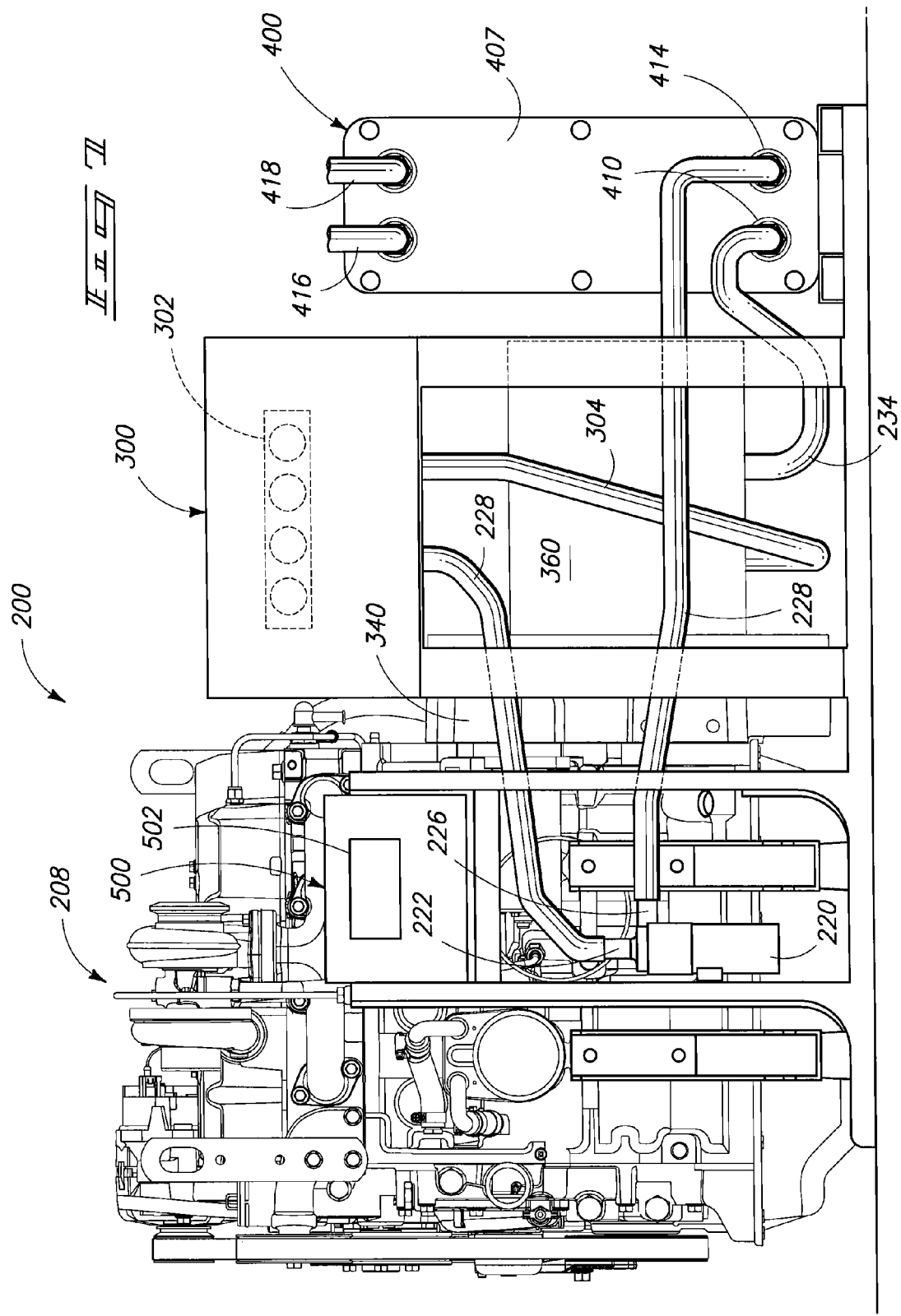
FIG. 7 is a side elevational view of the FIG. 3 power generation system illustrating a side view opposite the FIG. 3 side view.
Figure 8:
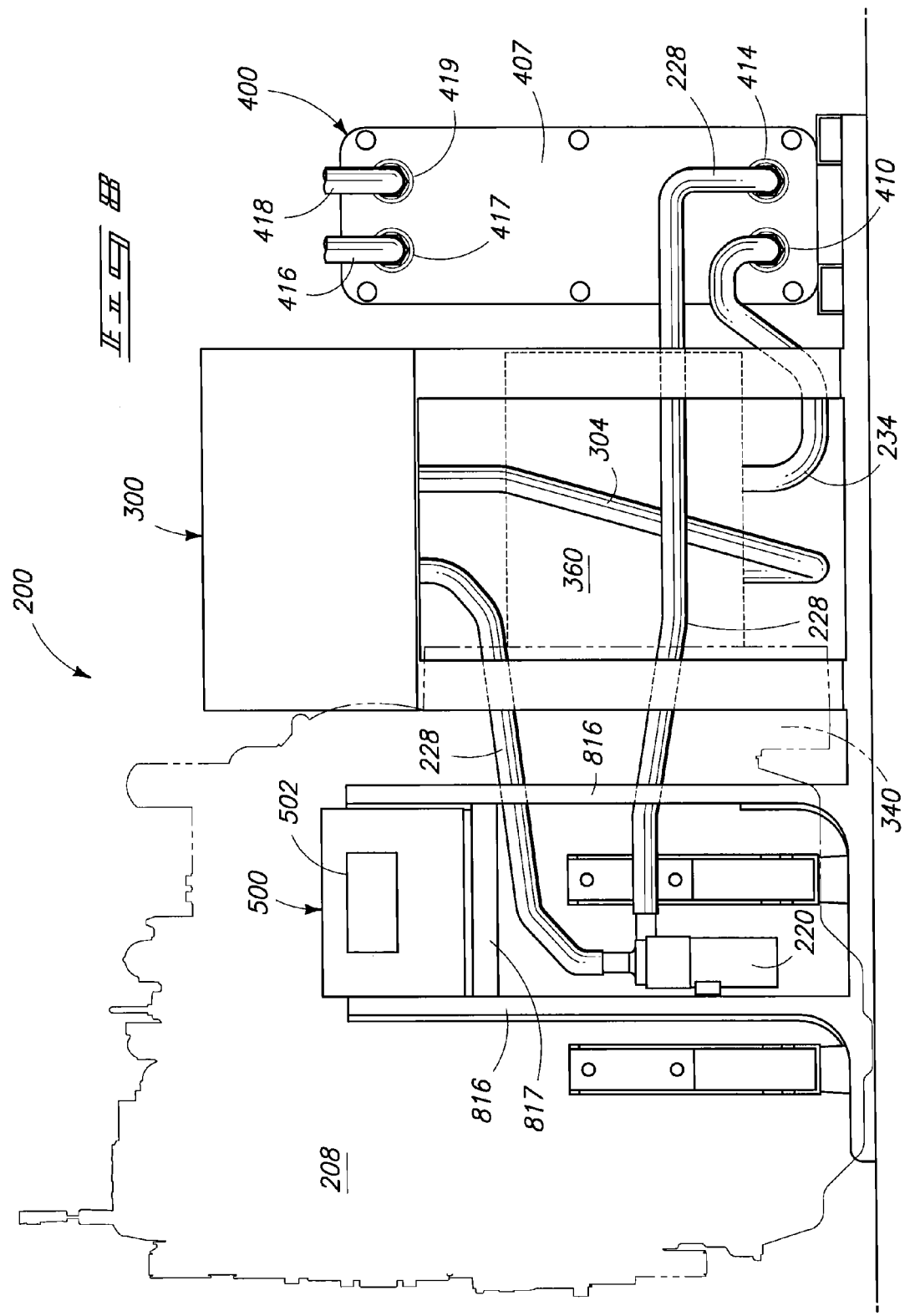
FIG. 8 is the FIG. 7 view emphasizing components of the exemplary power generation system.
Figure 9:
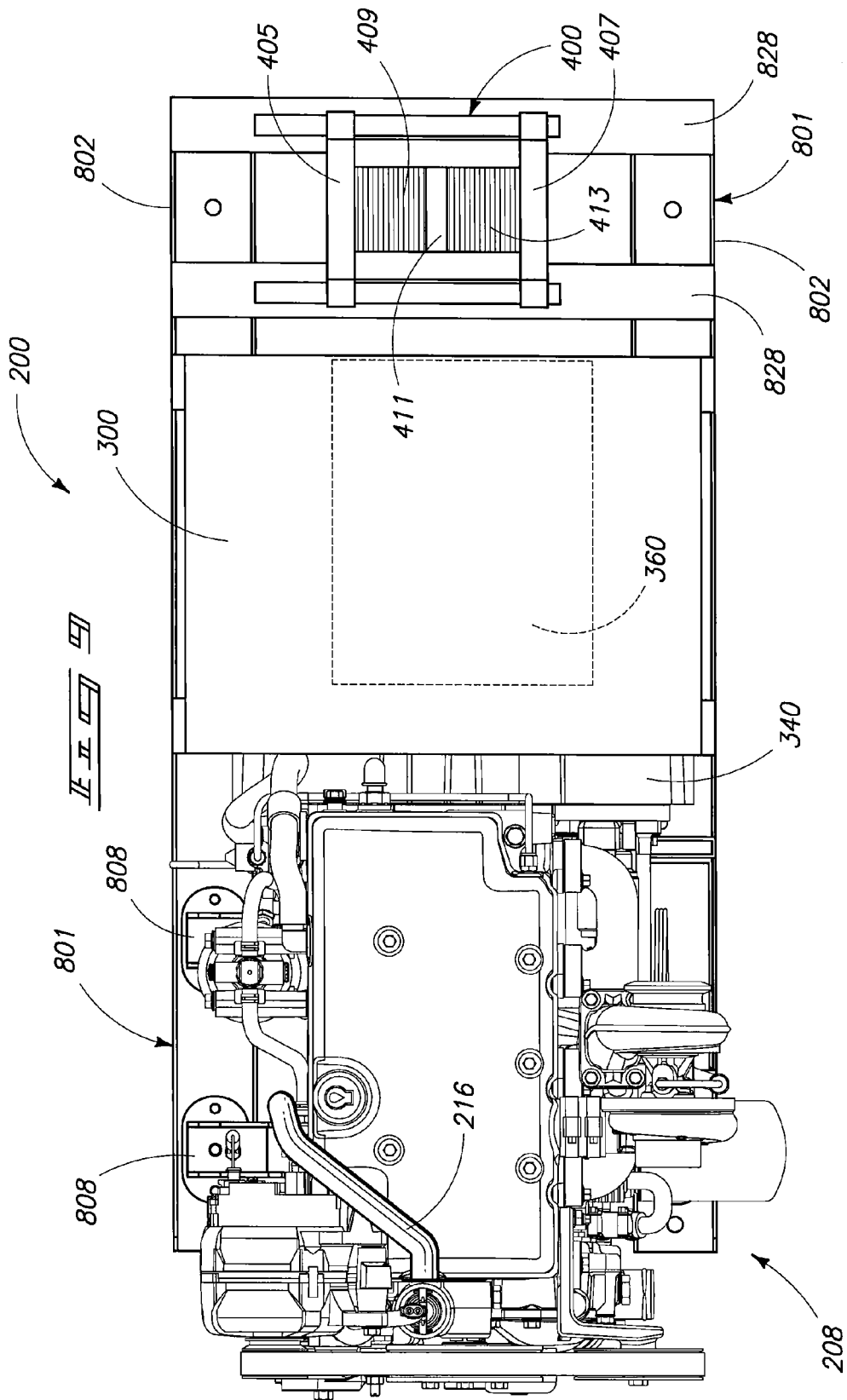
FIG. 9 is a top plan view of the FIG. 3 power generation system.
Figure 10:
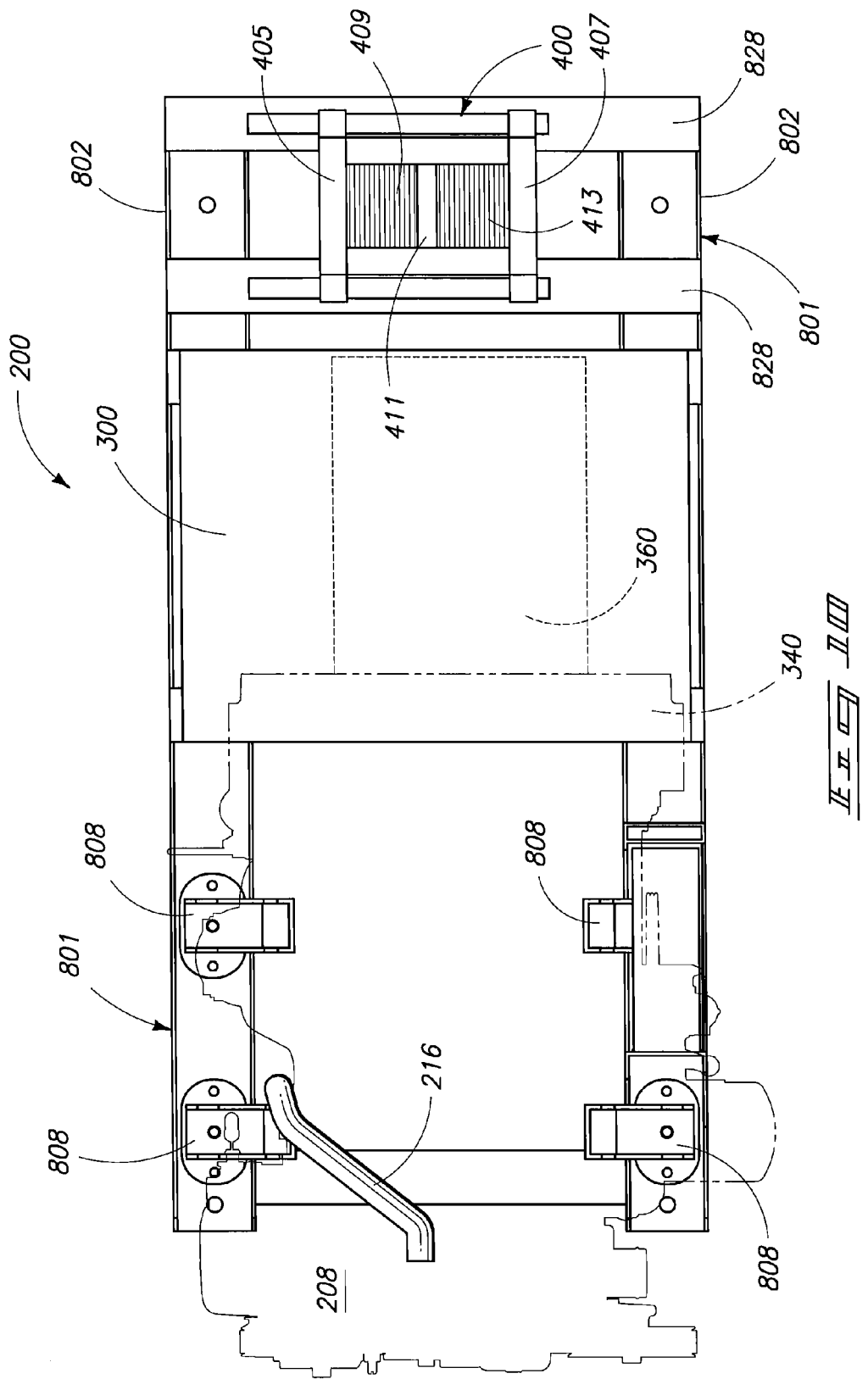
FIG. 10 is the FIG. 9 view emphasizing components of the exemplary power generation system.
Figure 11:
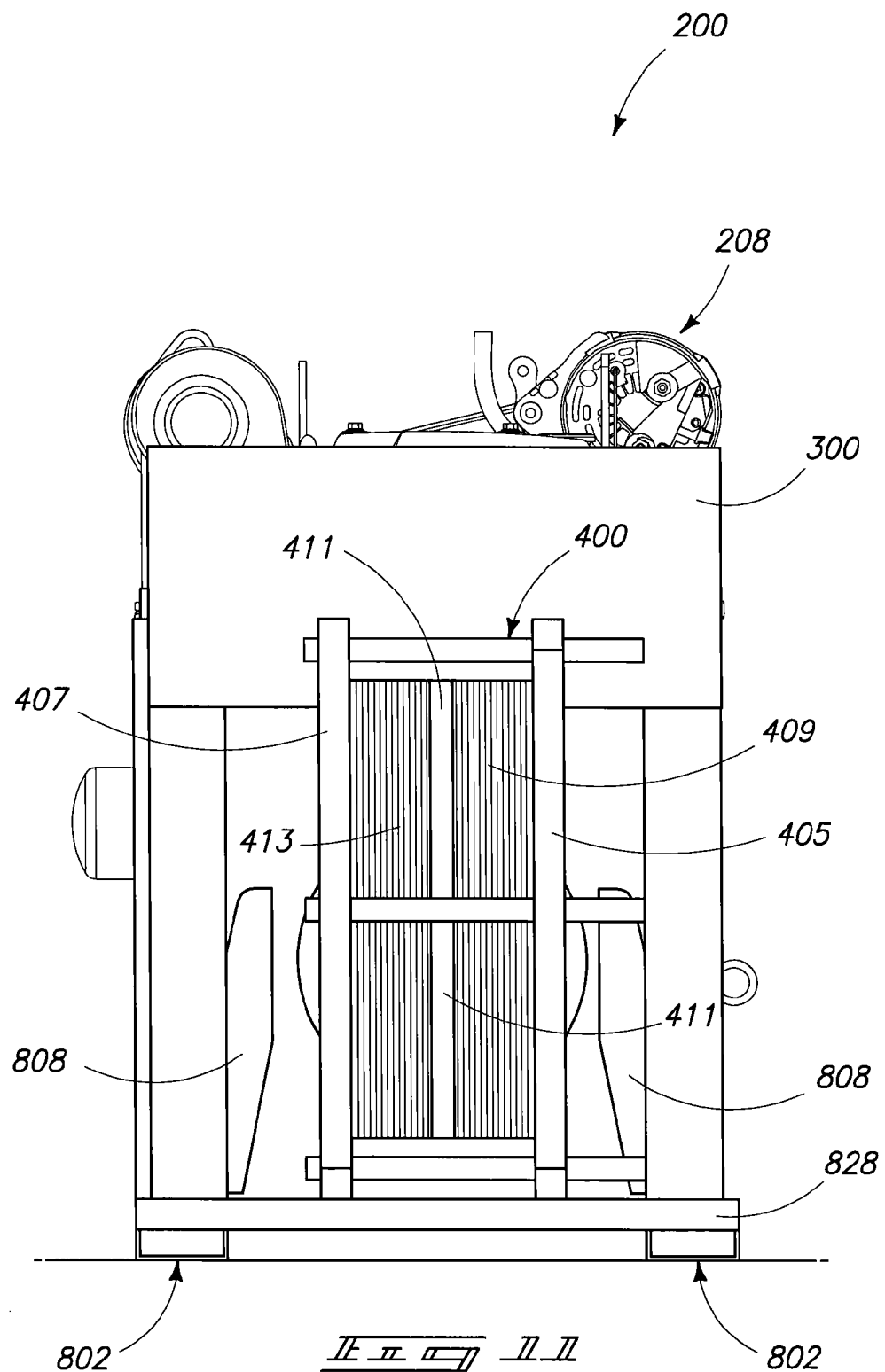
FIG. 11 is an elevational back view of the FIG. 3 power generation system.

Referring to FIGS. 7-8, an exemplary power generation system 200 includes a package control unit 500 illustrated as being positioned adjacent engine 208 and includes a display window 502. It should be understood that package control unit 500 could be positioned in any location relative the other components of power generation system 200. An exemplary package control unit collects, shares and transmits pertinent information between specific system components of power generation system 200 to effectively manage and optimize the collective cooperation between the components of the power generation system 200. For example, with respect to the engine, an exemplary package control unit 500 will monitor engine output (hp, torque, speed), battery voltage, engine temperature, exhaust temperature and engine oil temperature. With respect to the generator, an exemplary package control unit 500 will monitor the generator output and the temperature of the fluid (coolant) within the generator from the heat exchanger. With respect to the power electronics device, an exemplary package control unit 500 will monitor the temperature of the fluid (coolant) within the power electronics device, and monitor the electrical input to and output from the power electronics device.

With respect to the heat exchanger, an exemplary package control unit 500 will monitor two components (discussed more thoroughly below) of the heat exchanger, a hot circuit and a cold circuit. The hot circuit has two components which is represented here as hot circuit #1 and hot circuit #2, and the cold circuit has one component. The exemplary package control unit 500 will monitor inlet and outlet temperatures of the cold circuit and monitor the inlet and outlet temperatures of the hot circuit #1 and hot circuit #2, respectively. An example of a package control unit that could be employed for the package control unit 500 is commercially available from Woodward as model easY™gen generator set control model "1500".

Referring to FIG. 3, an exemplary heat exchanger 400 is illustrated positioned at an end of the power generation system 200 opposite engine 208. It should be understood that the heat exchanger could be positioned in any location relative the other components of power generation system 200. An example of a heat exchanger comprises a plate and frame design and is commercially available by Sondex as model Jernet 9 (www.sondexuk.com/gasketed). This plate and frame design of the exemplary heat exchanger comprises two fluids that pass in opposite directions up and down alternative channels formed in exemplary pressed plate packs 409 and 413 discussed more thoroughly below.

Figure 15:
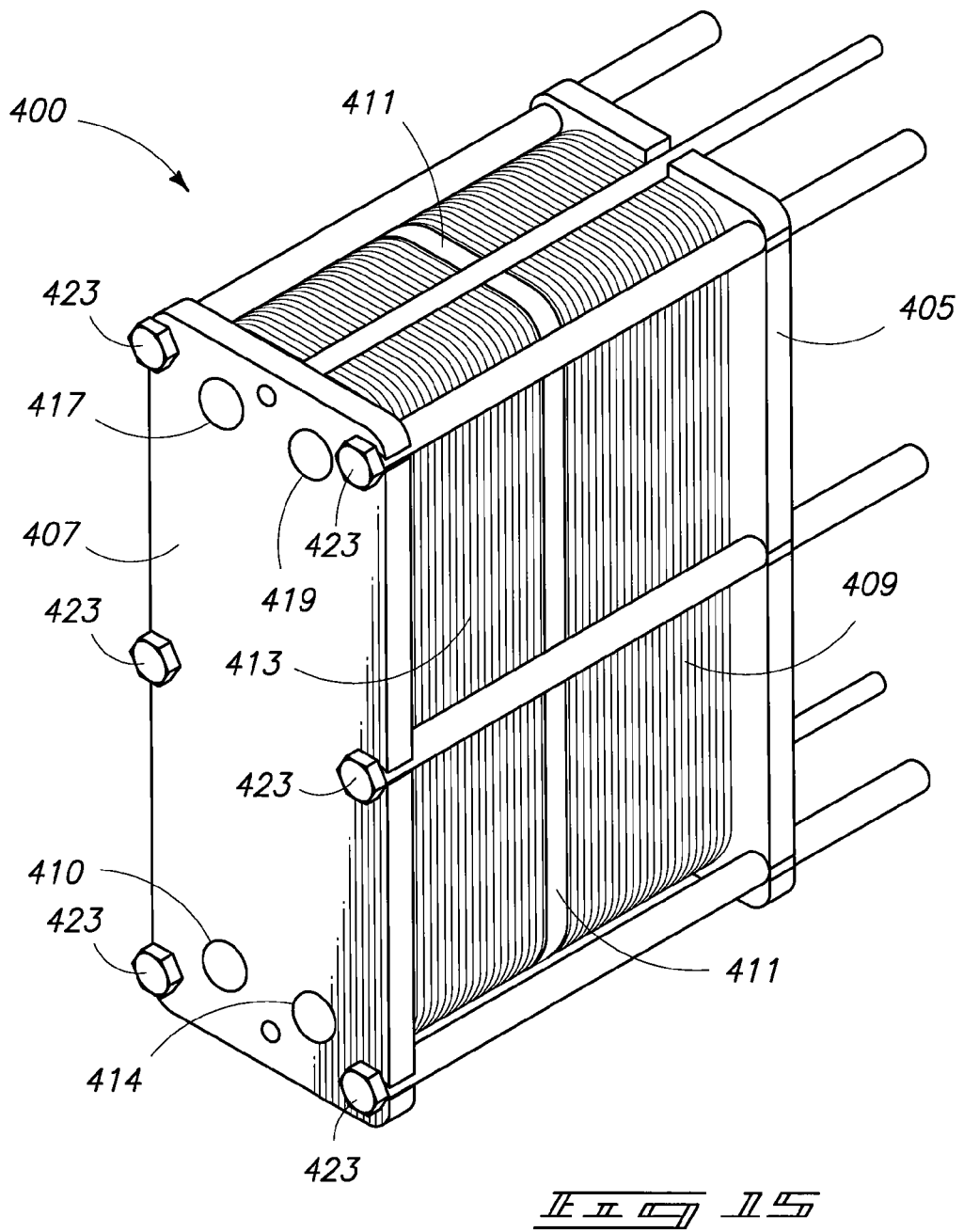
FIG. 15 is a perspective view of an exemplary heat exchanger according to an embodiment of the invention.

Referring to FIG. 15, in one exemplary embodiment, the heat exchanger 400 comprises frame side structures 405 and 407 secured on opposite sides of the respective plate packs 409 and 413 by, for example, clamping bolts 423. Exemplary frame side structures 405 and 407 comprise metal and exemplary plate packs 409 and 413 comprise metal. Plate packs 409 and 413 are divided by a center frame structure 411 which comprises, for example, a metal plate. Each frame side structure defines openings which function as inlets and outlets, for example, openings 410, 414, 417, 419 defined by frame side 407.

In some embodiments, the plate and frame design of the exemplary heat exchanger comprises the two hot circuits and the single cold circuit. In some embodiments, hot circuit #1 is represented as plate pack 413 and is dedicated for the power electronics and generator. In some embodiments, hot circuit #2 is represented as plate pack 409 and is dedicated for the engine cooling circuit. Hot circuit #1 and hot circuit #2 (plate packs 409 and 413) are separated by the center frame structure or plate 411. The cold circuit passes first through hot circuit #1 (plate pack 413), and then through hot circuit #2 (plate pack 409) before exiting the heat exchanger 400. That is, each hot circuit #1 and hot circuit #2 (plate packs 409 and 413) also comprises a cold fluid wherein the two fluids, one hot and one cold, pass in opposite directions, up and down in alternative channels formed in the respective plate packs 409 and 413. It should be understood that other exemplary heat exchangers could be used and include a water to air heat exchanger, for example, a radiator and/or cooling tower.

Figure 4:
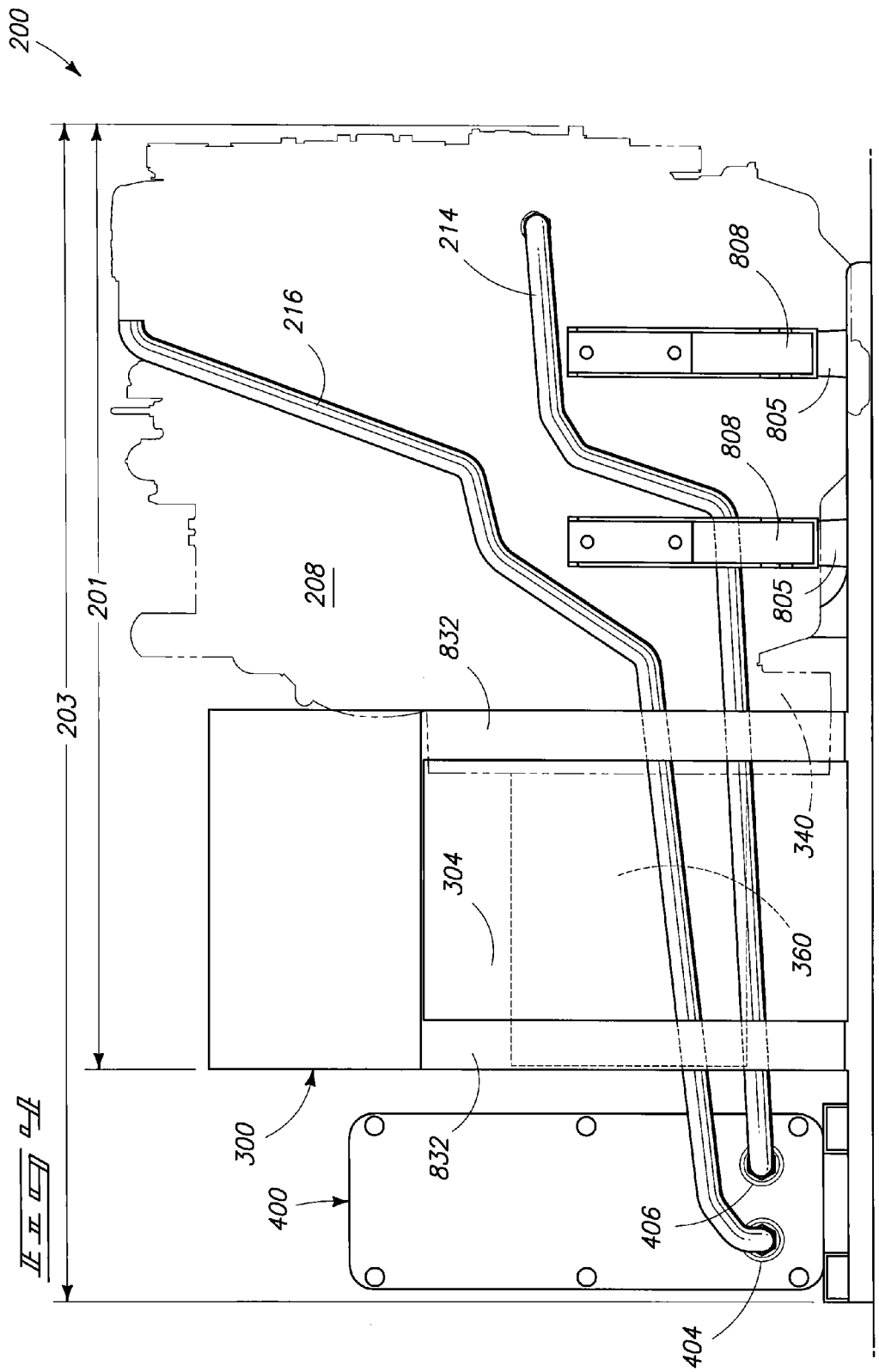
FIG. 4 is the FIG. 3 view emphasizing components of the exemplary power generation system.

Referring to FIGS. 3-4, an exemplary conduit system for transferring a fluid medium between the heat exchanger 400 and respective components of power generation system 200. The conduit system includes a plurality of discrete conduits which can comprise, for example, flexible materials such as rubber hoses or inflexible materials such as metal pipes, or any combination of the various materials. Conduit 216 extends from an opening 404 in heat exchanger 400 to an opening (not referenced) in engine 208 and provides a cooled or cold fluid medium to engine 208 from heat exchanger 400. The fluid medium enters engine 208 wherein heat energy from engine 208 is transferred to the fluid medium, and then the fluid medium exits engine 208 from an opening (not referenced) of engine 208 to enter conduit 214 wherein the warmed fluid medium returns to enter the heat exchanger through opening 406 to be cooled and re-circulated through conduit 216 and engine 208. It should be understood that the path just described for the fluid medium could be reversed through the respective conduits 214 and 216, and engine 208 and heat exchanger 400.

Referring to FIGS. 7-8, an exemplary conduit system for transferring a fluid medium between the heat exchanger 400 and respective components of power generation system 200 is shown. The plurality of discrete conduits comprise, for example, flexible materials such as rubber hoses or inflexible materials such as metal pipes, or any combination of the various materials. A first conduit 228 extends from an opening 414 in heat exchanger 400 to a first nipple 226 of a pump 220, for example an auxiliary pump, and a second conduit 228 extends from a second nipple 222 of auxiliary pump 220 to power electronic device 300. An exemplary auxiliary pump 220 provides pumping power to transfer a cooled or cold fluid medium to power electronics device 300 from heat exchanger 400. The fluid medium enters power electronics device 300 wherein heat energy from power electronics device 300 is transferred to the fluid medium, and then the fluid medium exits power electronics device 300 and enters conduit 304. Conduit 304 extends from power electronics device 300 to the generator (represented as generator housing 360) and receives the warmed fluid medium from the power electronics device 300 wherein the warmed fluid medium is further warmed by receiving heat energy from the generator. Conduit 234 extends from the generator to opening 410 of heat exchanger 400 and provides the path for the fluid medium to return to the heat exchanger 400 from the generator. The fluid medium is re-circulated through the heat exchanger to be cooled and re-circulated through the respective conduits 228, 304 and 234, and the respective components.

It should be understood that conduits 416 and 418 from respective openings 417 and 419 of heat exchanger 400 are provided to receive a fluid medium furnished by a consumer. For example, if power generation system 200 is to be provided on a vessel such as a boat, the fluid medium provided to conduits 416 and 418 can include seawater from the ocean. Other exemplary fluid medium include water or air. Either conduit 416 and 418 will be an inlet for the fluid medium with the other conduit comprising an outlet for the fluid medium to be dumped, for example, back into the ocean.

It should be understood that the path just described for the fluid medium could be reversed through the respective conduits and the respective components. It should be understood that pump 220 can be positioned in any location relative the respective components of power generation system 200, for example, below power electronics device 300 and adjacent generator housing 360. It should be understood that pump 220 can comprise an electric pump or a mechanical pump. It should be understood that pump 220 can be an independent pump driven under its own power or driven from engine 208.

Figure 5:
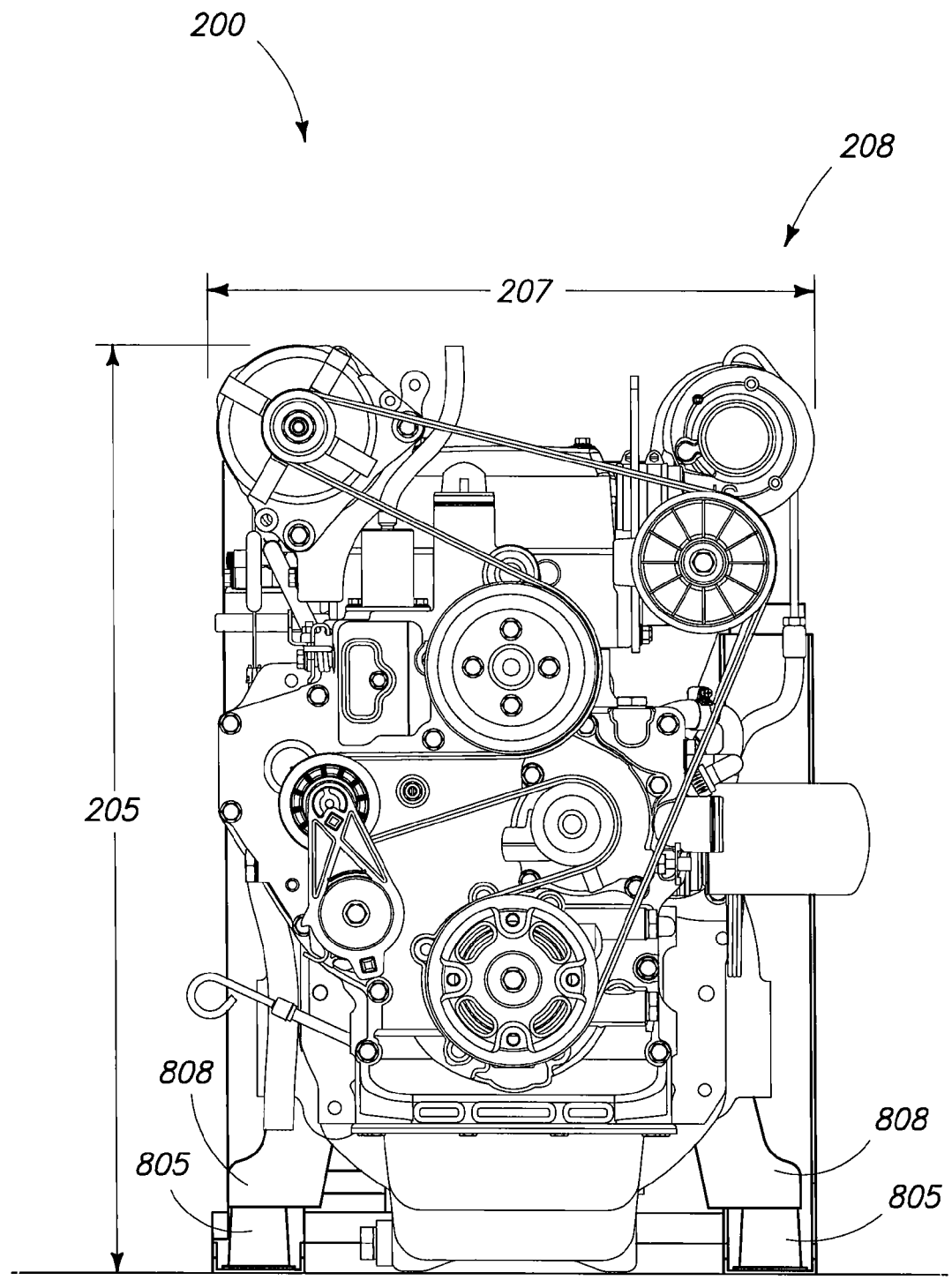
FIG. 5 is an elevational front view of the FIG. 3 power generation system.
Figure 6:
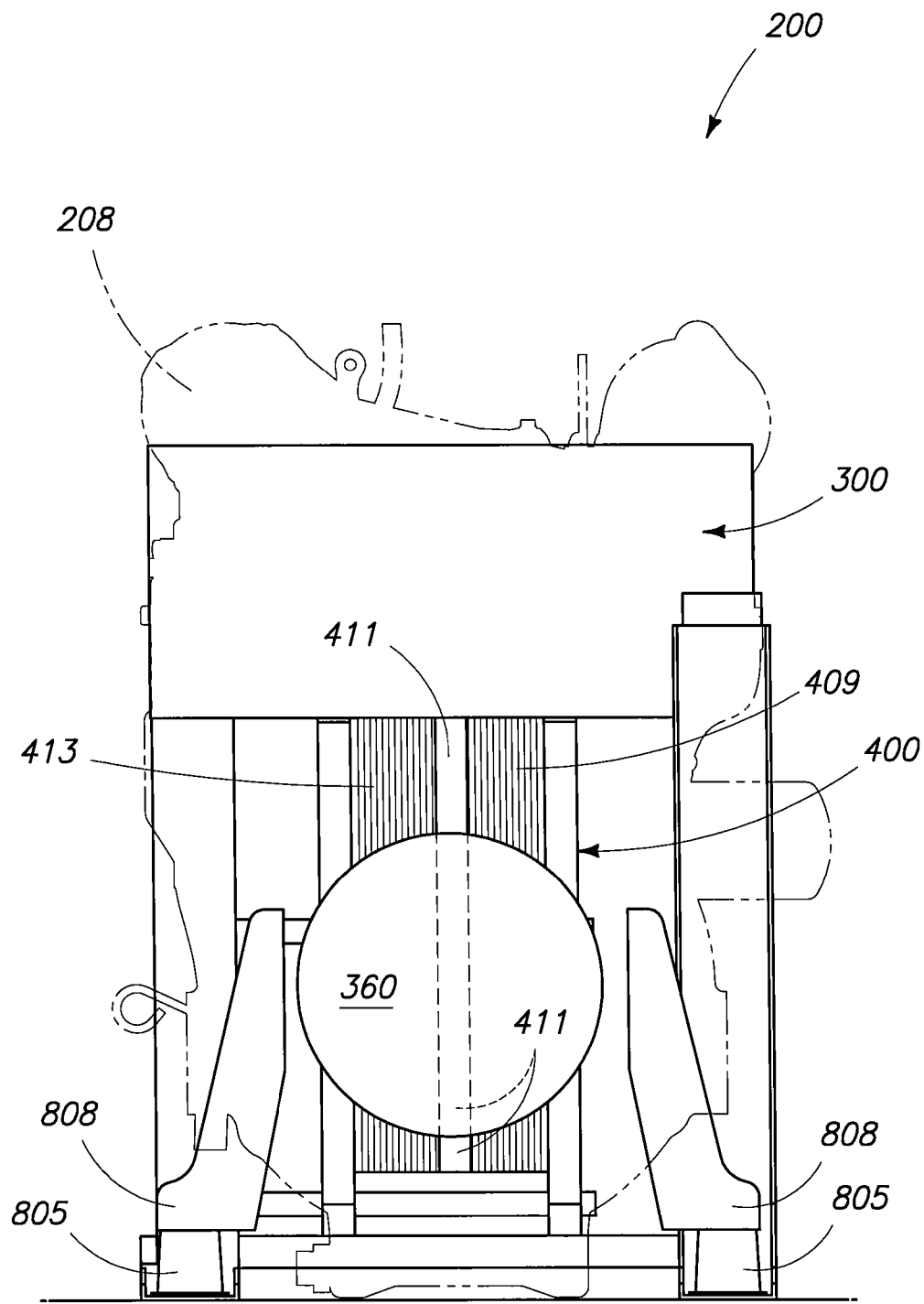
FIG. 6 is the FIG. 5 view emphasizing components of the exemplary power generation system.

Referring to FIG. 4, power generation system 200 has a length 203 ranging from about 45 to about 49 inches and defined from one end of engine 208 to an opposite end of heat exchanger 400. Power generation system 200 has a length 201 ranging from about 36 to about 40 inches without the heat exchanger 400, and defined from the one end of engine 208 to an opposite side of the power electronics device 300. Referring to FIG. 5, power generation system 200 has a height 205 ranging from about 28 to about 32 inches and defined from a bottom of engine 208 to a top of engine 208 opposite the bottom. Still referring to FIG. 5, power generation system 200 has a width 207 ranging from about 18 to about 22 inches and defined from the one side of engine 208 to an opposite side of engine 208. Power generation system 200 comprises a weight ranging from about 800 to about 900 pounds, for example, 850 pounds. Other dimensions or weights are possible.

Figure 18:
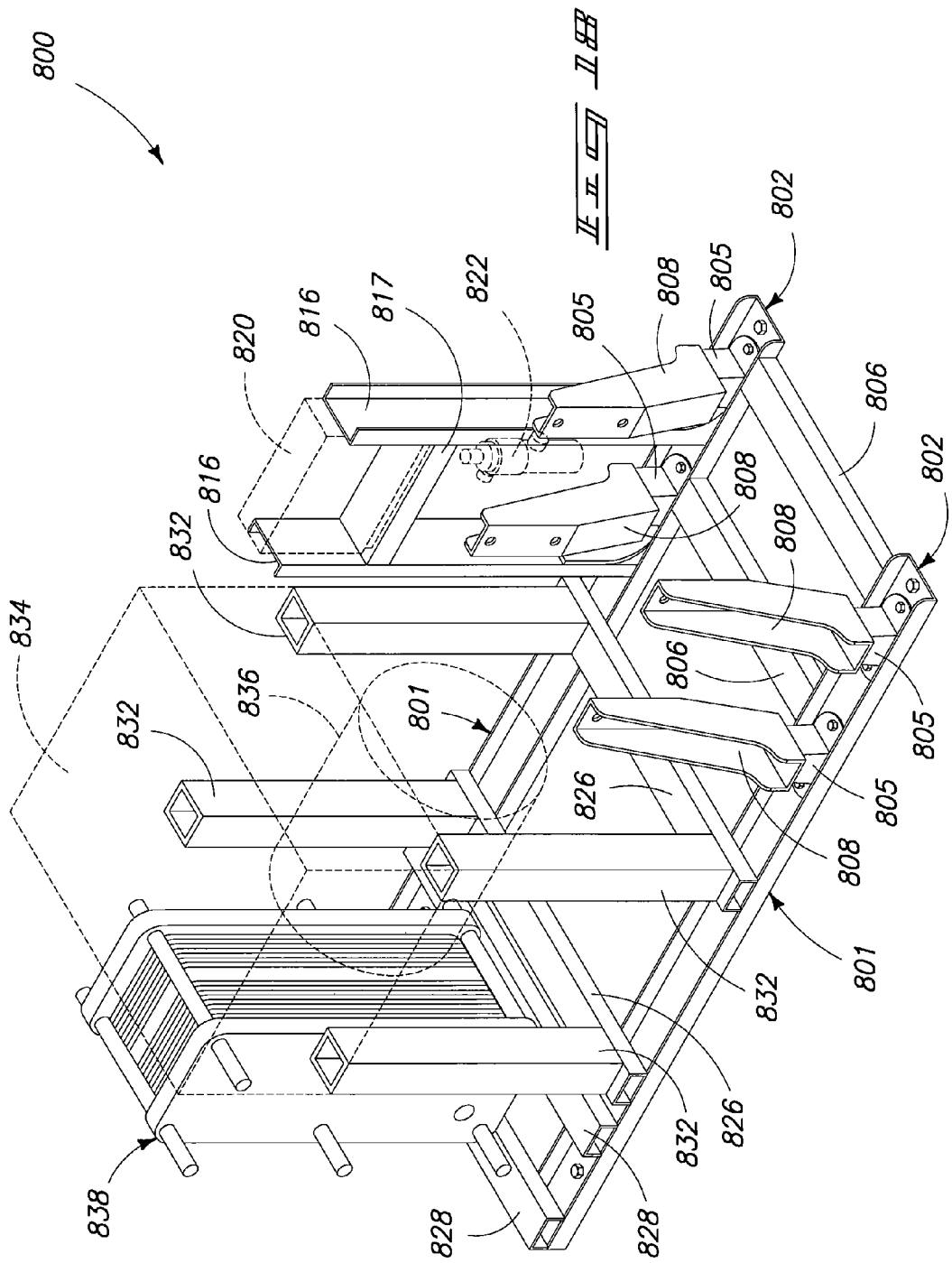
FIG. 18 is a perspective view of an exemplary support structure according to an embodiment of the invention.
Figure 19:
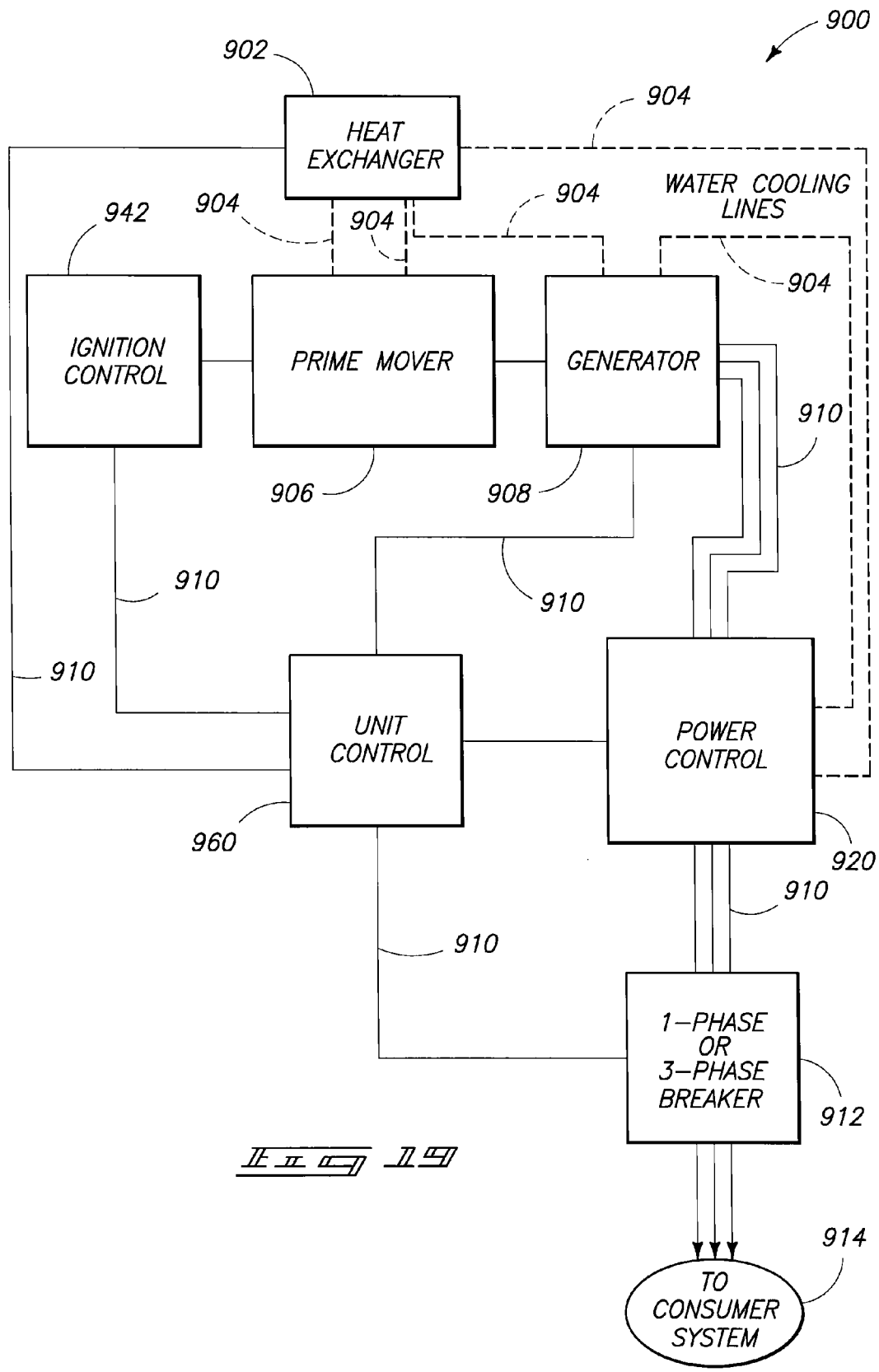
FIG. 19 is a block diagram of the exemplary components monitored by an exemplary package control unit (also referred to as unit control) according to embodiments of the invention.

Referring to FIG. 18, an exemplary support structure 800 for power generation system 200 is illustrated and comprises a frame 801 of any material that is adequately sturdy to support engine 208 and system components, for example, a metal such as steel. In one exemplary embodiment, u-shaped base portions 802 extend longitudinally and generally in parallel relation wherein spacers 806 are used to maintain the spaced relation of the u-shaped base portions 802 by extending between and secured to the respective u-shaped base portions 802. It should be understood that while only two base portions 802 and two spacers 806 are shown, any number of base portions 802 and spacers 806 can be provided for support structure 800. In one exemplary embodiment, base portions 802 comprise the portion of frame 801 to which the additional structure pieces or sections of frame 801 are secured. Moreover, the exemplary base portions 802 comprise the portion of frame 801 which rests and contacts a surface (not shown) to support an exemplary power generation system.

Still referring to FIG. 18, an exemplary frame 801 comprises brackets 808 that are secured to and extend upwardly from base portions 802 at one end of an exemplary support structure 800. In one exemplary embodiment, brackets 808 are secured to base portions 802 by bushings 805 that comprise, for example, rubber to dampen vibrations of the power generation system 200. Brackets 808 are secured to engine 208, either directly or with additional bushings (not shown) between brackets 808 and engine 208. A pair of cross rails 826 extend between and are secured to respective base portions 802. In one embodiment, cross rails 826 support posts 832 which extend upwardly from cross rails 826. Exemplary posts 832 comprise at least two in number, for example, four and are in space relation defining a square or rectangle. Exemplary posts 832 are used to support any combination of plurality of components for power generation system 200, for example, a power electronics device 834, a generation housing 836, and other components not shown secured to posts 832 such as a package control unit and auxiliary pump. Another pair of cross rails 828 are located adjacent posts 832 and extend between and are secured to respective base portions 802 to support heat exchanger 838. A pair of pillars 816 extend vertically from one base portion 802 adjacent two brackets 808 and include a crossbar 817 extending there between, and in one exemplary embodiment, pillars 816 and cross bar 817 support an auxiliary pump 822 and package control unit 820.

It should be understood that additional structure and beams can be provided on frame 801 to support additional components, for example, the generator. It should be understood that vibration isolators can be provided between any of the components of the exemplary power generation system and frame 801. Conventional generator sets use frames and/or frame rails strong enough to withstand torsional flexing between the engine and generator. However, the exemplary power generation systems disclosed herein can be comprised of materials other than steel as a result of the engine being coupled directly to the generator. That is, with the engine directly coupled to the generator, torsional flexing is reduced and the design allows for off-board components to be better isolated from vibrations of the engine. Accordingly, in exemplary embodiments, frame 801 does not have to be designed to overcome the substantial torsional flexing of the conventional frames, and therefore, can be designed with materials to provide a frame that is compact and lightweight.

Referring to FIG. 19, an overview 900 of the major components being monitored by the Package Control Unit (identified as Unit Control 960 in FIG. 19) according to the invention is illustrated as a block diagram. The Package Control Unit 960 monitors the engine (referenced as prime mover 906), generator 908, an ignition control 942 for the engine (prime mover 906), heat exchanger 902, the power electronics device (identified as power control 920) and customer connections, for example, a 3-phase breaker 912 to a consumer system 914. These components are coupled by electrical and/or communication lines 910 and a conduit system 904 of water cooling lines.

Figure 20:
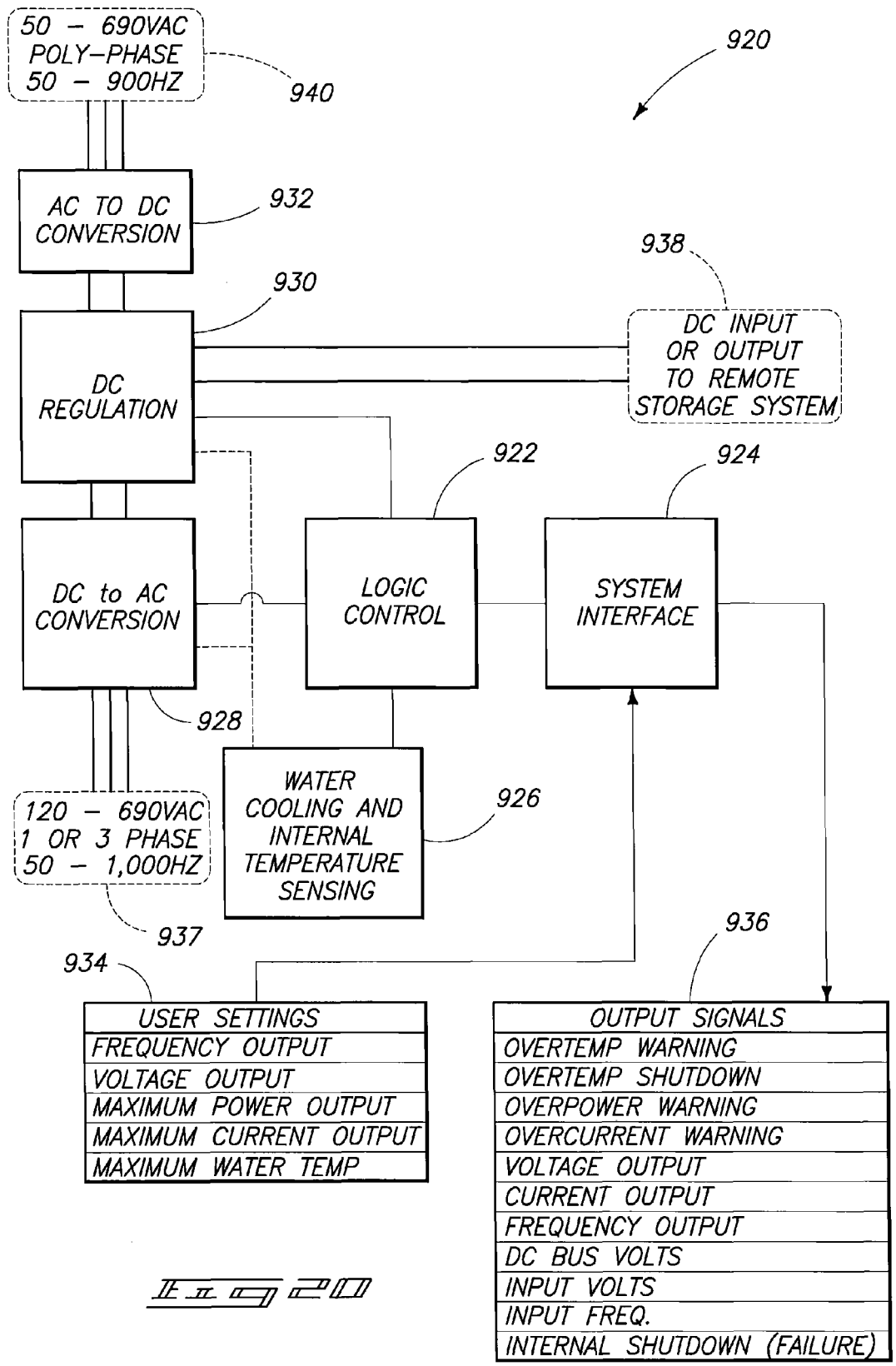
FIG. 20 is a block diagram of the exemplary components monitored by an exemplary power control (also referred to as power electronics device) according to embodiments of the invention.

Referring to FIG. 20, in some embodiments of the power control (power electronics device) 920, an exemplary system interface 924 is coupled to logic control 922 that allows the consumer/user to input user settings 934. The interface 924 also provides output signals 936. Exemplary output signals 936 can be in text or graphical format on the system interface 924, and can be exported as an electronic signal for remote viewing. The system interface 924 communicates with the logic control 922 wherein the logic control 922 receives the user settings 934 from the system interface 924 and monitors/regulates Water Cooling and Internal Temperature Sensing 926, DC Regulation 930 and DC-AC Conversion 928. In one embodiment, DC Regulation 930 is coupled with DC input or output to remote storage system 938. In one embodiment, DC Regulation 930 is coupled with AC to DC conversion 932 for exemplary conversion outputs 940 of 50-690 VAC, polyphase (for example, 3-18 phases) and 50-900 Hertz (Hz). In one embodiment, DC Regulation 930 is coupled with DC to AC conversion 928 for exemplary conversion outputs of 120-690 VAC, 1 or 3 phase and 50-1,000 Hertz. Based on User Settings 934 conditions, the Logic Control 922 will manage the power generation system and communicate with the System Interface 924 to provide Output Signals 936.

Exemplary User Settings 934 comprise: Frequency Output which sets the output frequency of the generator set; Voltage Output which sets the output voltage of the generator set; Maximum Power Output which sets the maximum power of the generator set and can not exceed a rated maximum output of the engine/generator; Maximum Current Output which sets the maximum current output of the generator set; and Maximum Water Temperature which sets the maximum water temperature of water (or of any exemplary fluid medium) exiting an exemplary heat exchanger to the generator, power electronics device, and engine.

Exemplary Output Signals 936 comprise: Overtemp Warning which warns of an over-temperature condition for coolants, fluids, intake air and exhaust of the power generation system; Overtemp Shutdown wherein a shutdown signal is provided due to an over-temperature condition for coolants, fluids, intake air and exhaust of the power generation system; Overpower Warning which is a warning of an overpower condition for the engine, generator, and/or generator set; Overcurrent Warning which is a warning of an over-current condition for the generator, and/or generator set; Voltage Output which indicates voltage output for the generator, and/or generator set; Current Output which indicates current output for the generator, and/or generator set; Frequency Output which indicates frequency output for the generator, and/or generator set; DC Bus Volts which indicates voltage of a DC Bus; Input Volts which indicates input volts to power electronics and/or from secondary power supply; Input Freq which indicates input frequency to power electronics and/or from secondary power supply; and Internal Shutdown (Failure) which provides a signal to indicate internal shutdown due to failure of a component internal to the generator set.

Figure 21:
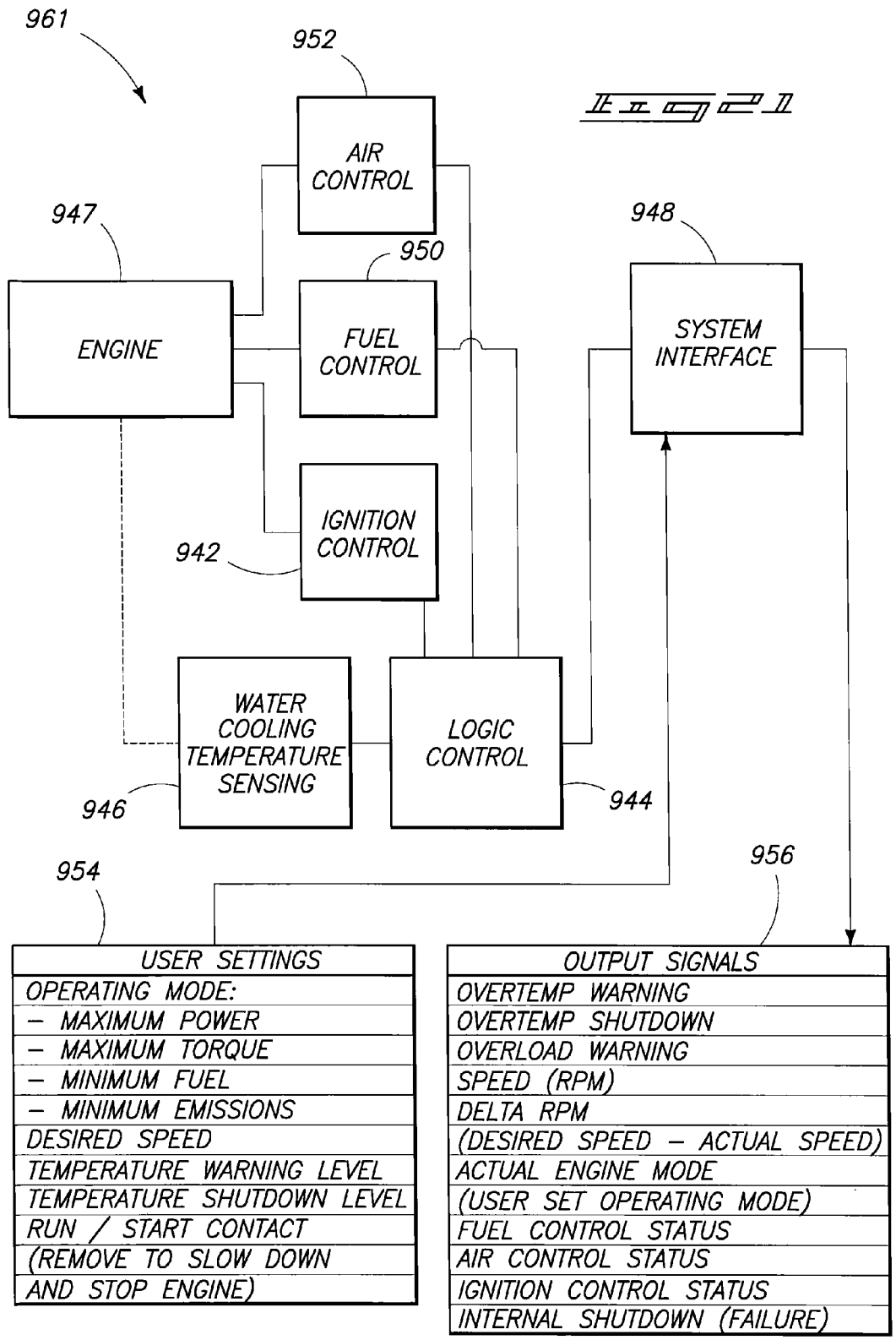
FIG. 21 is a block diagram of an exemplary ignition control according to embodiments of the invention.

Referring to FIG. 21, an overview 961 of an exemplary ignition control 942 according to embodiments of the invention is illustrated. The ignition control 942 monitors, manages and controls logic blocks that influence ignition of the engine 947. Control logic blocks that influence the ignition of the engine 947 include Air Control 952, Fuel Control 950, Ignition Control 942, and Water Cooling Temperature Sensing 946. Based on User Settings 954 (via the System Interface 948), the Logic Control 944 will monitor, manage and control logic blocks that influence ignition of the engine 947.

An exemplary Logic Control 944 receives the User Settings 954 from the System Interface 948. Via the user settings 954, the Logic Control 944 will monitor all parameters for specified maximum or minimum limits. The Logic Control 944 will then manage one, any combination or all of the blocks that influence the ignition of the engine 947 to prevent the overall power generation system from exceeding the specified maximum or minimum limits. Based on User Settings 954, the Logic Control 944 will also communicate with the System Interface 948 to provide Output Signals 956.

Still referring to FIG. 21, exemplary User Settings 954 comprise: Operating Mode which can be user specified or automatically determined wherein Generator Set (engine) can be configured to operate for maximum torque, maximum power, minimum fuel (fuel efficiency), and/or minimum emissions (low emissions) mode; Desired Speed which specifies the desired speed of the generator set and/or components of the power generation system; Temperature Warning Level which sets the warning level for various temperatures of coolants, fluids, intake air and/or exhaust of the power generation system; Temperature Shutdown Level which sets the shutdown level for the power generation system or components thereof based on various temperatures of coolants, fluids, intake air and exhaust of the power generation system; and Run/Start Contact which specifies time to crank engine for starting the power generation system.

Still referring to FIG. 21, exemplary output signals 956 comprise: Overtemp Warning which warns of an overtemperature condition for coolants, fluids, intake air and exhaust of the power generation system; Overtemp Shutdown which provides shutdown signal due to an overtemperature condition for coolants, fluids, intake air and exhaust of the power generation system; Overpower Warning which warns of an overpower condition for the engine, generator, and/or generator set; Speed (RPM) which indicates speed of prime mover (engine) and generator in RPM; Delta RPM which indicates differential in desired and actual speed of prime mover and generator in RPM. (Differential is used when comparing engine speed and electrical load (demand) at the output connections); Actual Engine Mode which indicates actual Mode of engine; Fuel Control Status which indicates actual Mode of Fuel Control 950; Air Control Status which indicates the actual Mode of the Air Control 952; Ignition Control Status which indicates the actual Mode of the Ignition Control 942; Internal Shutdown (Failure) which provides signal to indicate internal shutdown due to failure of a component which is internal to the generator set.

Figure 22:
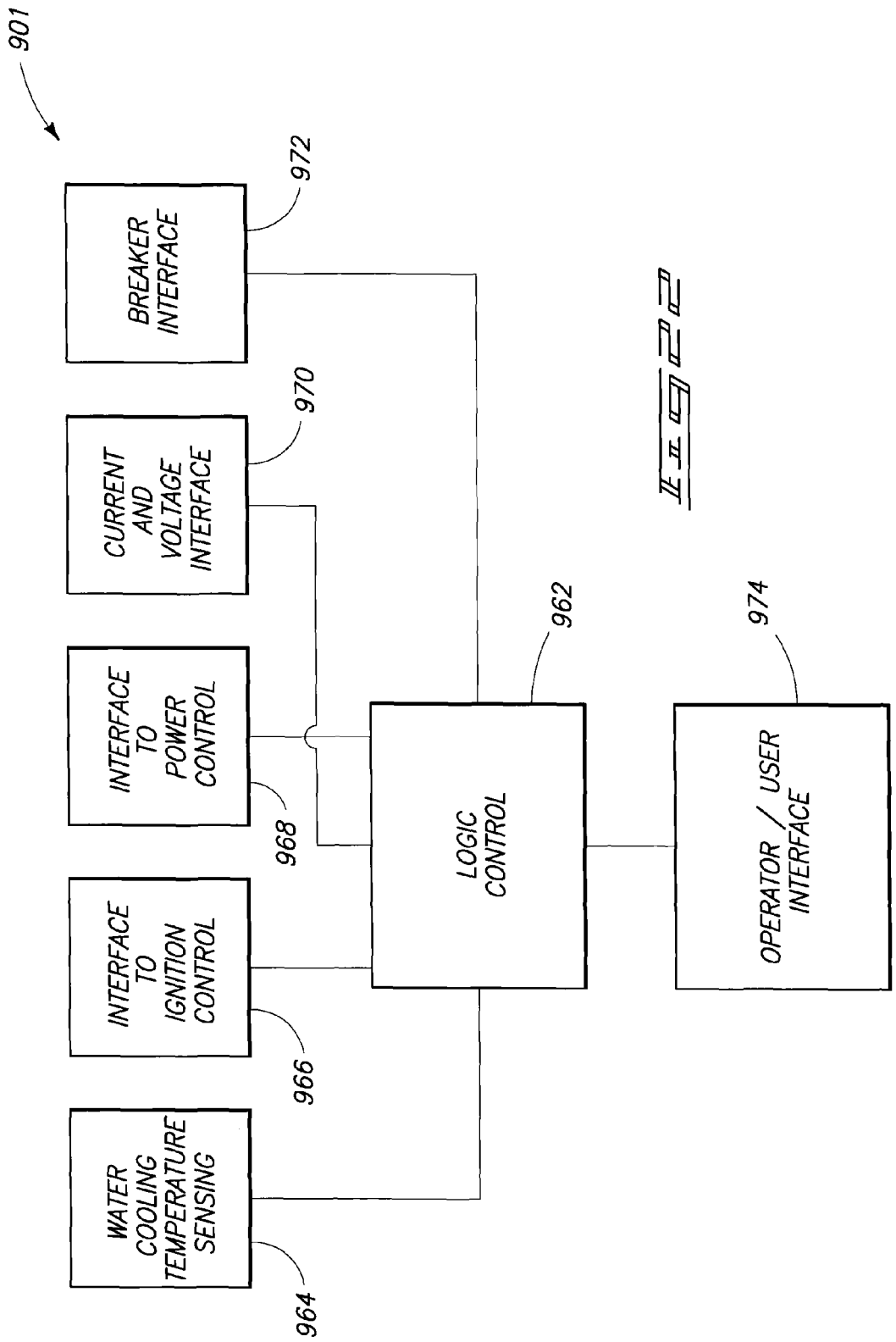
FIG. 22 is a block diagram of an exemplary Unit Control/Logic Control according to embodiments of the invention.

Referring to FIG. 22, an exemplary Unit Control/Logic Control 901 interacts with the Ignition Control, Heat Exchanger, Generator, Power Control and Electrical Breaker. The Logic Control 962 is managed based on inputs from the Operator/User Interface 974. The Operator/User Interface 974 can be onboard or remote via communication connection. The Logic Control 962 will monitor and manage the following: Water Cooling Temperature Sensing 964 which senses inlet and outlet temperatures of cooling fluid medium (e.g., water) and coolant circuits; Interface to Ignition Control 966 which monitors and manages the Ignition Control unit; Interface to Power Control 968 which monitors and manages parameters associated with the Power Control unit; Current and Voltage Interface 970 which monitors the current and voltage of the generator output; and Breaker Interface 972 which determines if circuit breaker is open or closed. If a powered breaker is used, the Logic Control 962 may be used to control the opening and closing of the breaker.

Referring to FIG. 23, another exemplary Unit Control/Logic Control 903 configuration is illustrated. An exemplary Unit Control/Logic Control comprises a high level interaction between various system control components. Control components include: Unit Master Controller 992, Engine Control 976, Power Electronics Control 982, and Unit Control BIOS 977. For example, an exemplary Unit Control BIOS 977 interacts with Unit Master Control 992, Engine Control 976, and Power Electronics Control 982. The Unit Control Bios 977 contains: Communications Port 939 for the Power Unit; Communications Port 941 for the Ignition Unit; monitoring for Generator Voltage 943; monitoring for Generator Output Current 945 (the parameter values provided in this FIG. for any element/component are only exemplary, with the ranges of values provided throughout this document being applicable); monitoring for Output Voltage 991; monitoring for Output Current 985; monitoring of the Breaker Control 983; monitoring of Temperature Sensing components 981; and monitoring for optional Analog I/O 979.

Still referring to FIG. 23, in exemplary embodiments, Generator Frequency 937 is calculated from Generator Voltage 943. Generator Power 933 is calculated from Generator Voltage 943 and Generator Current 945. Output Frequency 987 is calculated from Output Voltage 991. Output Power 989 is calculated from Output Voltage 991 and Output Current 985. Moreover, in an exemplary embodiment, the Engine Control 976 interacts with Unit Control BIOS 977, Power Electronics Control 982, and Unit Master Control 992. The Engine Control 976 contains Start/Stop 978 and Speed Control 980 blocks. Start/Stop 978 interacts with Unit Control BIOS 977 and Speed Control 980 blocks. Speed Control 980 interacts with Unit Control BIOS 977, Power Electronics Control 984 and Frequency Control 986. An exemplary Power Electronics Control 984 interacts with Unit Control BIOS 977, Engine Control 976, and Unit Master Control 992. Power Electronics Control 984 contains Voltage Control 990, VAR Control 988, Frequency Control 986, and Power Control 984. An exemplary Voltage Control 990 block interacts with Unit Control BIOS 977, an exemplary VAR Control 988 interacts with Unit Control BIOS 977, an exemplary Frequency Control 986 interacts with Unit Control BIOS 977 and Engine Control 976, and an exemplary Power Control 984 interacts with Unit Control BIOS 977 and Engine Control 976.

Referring to FIG. 24, an exemplarily method for generating power 651 is described according to one a various embodiments of the invention.

Still referring to FIG. 24, a first method step 653 includes providing a generator system comprising a generator having a power output connector.

Still referring to FIG. 24, another exemplary method step 655 includes coupling the power output connector to a first power application, the first power application comprising a first power demand.

Still referring to FIG. 24, another exemplary method step 657 includes activating the generator to provide a first power component to meet the first power demand.

Still referring to FIG. 24, another exemplary method step 659 includes monitoring the first power demand of the first power application.

Still referring to FIG. 24, another exemplary method step 661 includes receiving an indication that the first power demand has changed to a second power demand different from the first power demand.

Still referring to FIG. 24, another exemplary method step 663 includes notifying the generator system of the indication.

Still referring to FIG. 24, another exemplary method step 665 includes after the notifying, performing one of the following tasks: maintaining the first power component to meet the second power demand, or modifying the first power component to a second power component to meet the second power demand, the second power component being different from the first power component.

Still referring to FIG. 24, another exemplary method step 667 includes wherein the first and second power components comprise different power density outputs.

In an exemplary embodiment, Unit Master Control 992 interacts with Engine Control 976, Power Electronics Control 982 and Unit Control BIOS 977. The Unit Master Control 992 contains Mode Control 995, Breaker Control 994, Load Control 996, and Synchronize Control 997 blocks. Mode Control 995 interacts with Breaker Control 994, Load Control 996, and Synchronize Control 997 within the Unit Maser Control 992. Mode Control 995 also interacts with Engine Control 976 and Power Electronics Control 982. Breaker Control 994 interacts with Unit Master Control 992, Mode Control 995, and Unit Control BIOS 977. Load Control 996 interacts with Unit Master Control 992, Mode Control 995, Engine Control 976, and Power Electronics Control 982. Synchronize Control 997 interacts with Unit Master Control 992, Mode Control 995, Engine Control 976, and Power Electronics Control 982.

Exemplary embodiments described herein provide advantages and benefits not recognized by the conventional power generation systems. For example, embodiments of power generation systems described through out this application (for example, as described in FIGS. 1 and 2, and for power generation system 200) comprise exemplary generator sets with the ability to provide multiple load capability. These exemplary generation sets are capable of managing a primary electrical load as well as a secondary electrical load. In contrast, conventional generator sets are capable of having only one output for one load which is distributed at a switchgear or a switchboard. Additionally, the exemplary generation sets according to the invention of this disclosure are capable of managing multiple loads, each having a different voltage, wherein again, the conventional generator sets are capable of having only one output for one load.

Moreover, the exemplary power generation systems/generation sets disclosed herein comprise global power generation packages that can be configured for selectable voltage and/or selectable frequency. Additionally, due to the size (e.g., footprint and weight) of the exemplary power generation systems/generation sets disclosed herein, advantageous mounting configurations are possible. For example, because of the smaller footprint and/or size of the generation sets provided herein, the generator can be directly mounted to the engine (prime mover) and/or flywheel housing. By being able to mount the generator directly to the engine, unique and beneficial mounting configurations are possible that are not possible with conventional generation sets. Furthermore, the support structure 800 for exemplary power generation systems disclosed herein, for example, frame 801 illustrated in FIG. 18 is lighter in weight compared to frame rails of conventional generation sets, and allows for sensitive components to be isolated from engine vibration.

Furthermore, since the exemplary power generation systems disclosed herein comprise liquid cooled components, for example, the engine (prime mover), generator and power electronics, and in combination with the variable speed operation possible with the system disclosed herein, the combination allows for a quieter operating power generation system. Additionally, the liquid cooled components of exemplary power generation systems disclosed herein removes heat from the respective components to the air in a more optimum mode by, for example, a radiator, cooling tower, keel cooler, etc. Still further, the liquid cooled components allow for an enclosure of the power generation systems, or various components thereof, to be more tightly sealed which reduces sound waves produced from the operation of the power generation systems to exit outside the environment of an exemplary enclosure. Additionally, tightly sealed power electronic devices and generators are less prone to ingress by environmental contaminants such as snow, dirt, sand, bugs and other debris. This increases the reliability of the exemplary power generation systems disclosed herein compared to conventional systems, which is important if not imperative for some applications, such as military operations. In fact, the exemplary power generation systems disclosed herein have a N+2 reliability built in, and as a result, is a comparatively higher reliable system.

Furthermore, the variable speed capability of the exemplary power generation systems in combination with the liquid cooled components allows the power generation systems to operate at higher RPMs than conventional power generation systems. Higher RPMs produce shorter sound waves emanating from the exemplary power generation systems, and therefore, less sound attenuation material is needed to sound proof the power generation system. Since less soundproof material is used, the exemplary power generation system will be lighter in weight than conventional power generation systems. Alternatively, if the same amount of soundproof material routinely used for conventional power generation systems is used for the power generation systems disclosed herein, then the power generation system disclosed herein will be quieter.

Moreover, the liquid cooled components of the exemplary power generation systems can contribute to increased fuel utilization. For example, conventional combined heat and power (CHP) applications consist of a generator set producing electricity with a heat recovery equipment on the exhaust system. This conventional CHP has the heat from the engine (for example, transmitted to an engine jacket water system) and exhaust system transferred to the environment, for example, a building for heating and cooling applications. Moreover, heat rejected from air passing through the generator is vented to the atmosphere as lost energy. However, the exemplary power generation systems disclosed herein can capture the heat energy rejected from the components that are coupled to heat exchanger(s) in addition to the heat energy captured from the engine water and exhaust system. Additionally, the exemplary power generation systems disclosed herein allow for more efficient cooling of the environment, for example, the engine room of a vessel or ship because the fluid medium which has captured the thermal energy from the respective components can be transmitted to remotely mounted cooling devices such as radiators, cooling towers, etc. The remotely mounting of cooling devices reduces the need for sizable air handling equipment in the exemplary engine room of the vessel or ship.

Another advantage/benefit of the exemplary power generation systems disclosed herein is the addition of a secondary input allows for zero (0) cycle power outage. For example, the exemplary power generation systems can use batteries as a secondary input connected to a building distribution system. If the power supply from a municipality is interrupted or fails, the secondary input will provide power until the generator set of the power generation system can be operational. In contrast, conventional power generation systems need to ramped up to approximately 1,800 RPMs before closing a coupled breaker system to provide the power energy to the load (for example, the building distribution system). The exemplary power generation systems disclosed herein will begin producing and providing power energy as soon as the generator is turning without any noticeable interruption of power to the consumer/customer.

Regarding exemplary control schemes for some exemplary embodiments of the power generation systems disclosed herein, the system is designed to provide the engine RPM and generator output to follow the electrical load. Alternatively, for some exemplary embodiments of the power generation systems disclosed herein, the systems can have the capability to manage or have the operator (consumer/customer) select between torque, horsepower and fuel consumption. These configurations for exemplary systems will allow the operator (consumer/customer) to optimize capabilities of the exemplary systems with respect to different applications requiring different power demands.

What is claimed is:

1. A power generation system comprising:
   a generator;
   a power electronics device coupled to the generator and comprising first and second power application connectors, the first power application connector configured to be coupled to a first power application, the first power application is connected to a first power demand, and the second power application connector configured to be coupled to a second power application, the second power application is connected to a second power demand, the second power demand being different from the first power demand;
   the first power application configured to meet the first power demand or the second power demand which is connected to the second power application; and
   the second power demand configured to either use or provide power which is different from the first power demand.

2. The system in claim 1 wherein the second power application is configured to use or provide power to the first power application to meet the first power demand based upon an indication of a change in the system.

3. The system in claim 1 wherein the second power application is configured to selectively contribute in proportion to the first power application to meet the first power demand.

4. The system in claim 1 wherein proportions of respective power application contributions are capable of being modified by an external indication to the power generating system, the external indication defining a domain within which the system is selectively configured to operate.

5. The system in claim 4 wherein the external indication is configured to selectively modify the domain to establish relationships between power applications, power application priorities, power application durability and power generating system sustainable designed capability.

6. The system in claim 4 wherein the domain translates the external indication into unique indications for each power application in the generating system which provides the capability to modify the proportion of power application contribution.

7. The system in claim 4 wherein the domain comprises logic for establishing priorities between respective power applications to enable the power generation system to optimize respective proportions of power applications to meet the connected power demands.

8. The system in claim 1 further comprising an interface configured to provide record by time period of: power demand, utilization of design capacity, estimates of consumption, estimates of consumption or production by power application connection, and of the cumulative power generation system.

9. The system of claim 1 further comprising:
   a logic control configured to model designed capabilities of respective power applications; and
   a mode control configured to combine the design capabilities to create a design capability of the power generating system which is different from the design capabilities of the respective power applications.

10. The system in claim 9 wherein the logic control models:
    maximum sustainable available power to a connected power demand; and
    maximum intermittent and instantaneous available power.

11. The system of claim 9 wherein the logic control is configured to assess the durability of respective power applications within the model and indicates the assessment to the power generation system.

12. The system of claim 10 wherein the logic control is configured to change proportions of contributions of the respective power applications to change power available to the respective power demands to another maximum sustainable available power.

13. the system of claim 9 wherein the mode control is configured to:
    receive an indication from at least one of the power applications; and
    in response to the indication, modify activation and proportion contributions to the respective power applications.

14. The system of claim 1 further comprising:
    a thermal system connected to components of the power generation system;
    a thermal system sensor in sensing relation with the thermal system; and
    a thermal component sensor in sensing relation with at least one component of the system.

15. The system of claim 14 wherein the thermal system sensor is configured to indicate a temperature of the thermal system that is representative of the maximum sustainable design capability of the power generation system.

16. The system of claim 15 further comprising, if the temperature is exceeded, a capability to establish a new maximum sustainable design capability for the power generation system.

17. The system of claim 15 further comprising, if the temperature is exceeded, a capability to modify proportions of power application contributions to meet the respective power demands.

18. The system of claim 15 wherein the thermal component sensor is configured to indicate a temperature of the at least one component that is representative of the maximum sustainable design capability of the at least one component.

19. The system of claim 18 further comprising the capability to establish a different maximum sustainable design capability for the power generation system in response to a temperature differential between the thermal system and the at least one component that exceeds a threshold temperature differential representative of the maximum sustainable design capability of the power generation system.

20. The system of claim 18 further comprising, in response to the different maximum sustainable design capability, the capability to modify proportions of power application contributions to meet the respective power demands.

* * * * *

UNITED STATES PATENT AND TRADEMARK OFFICE
CERTIFICATE OF CORRECTION

PATENT NO. : 8,222,756 B2  
APPLICATION NO. : 13/170108  
DATED : July 17, 2012  
INVENTOR(S) : Douglas Alan Koeneman and Edward Woods Page 1 of 1

It is certified that error appears in the above-identified patent and that said Letters Patent is hereby corrected as shown below:

Column 2, line 3 – Replace "motivation as led" with --motivation has led--

Column 10, line 3 – Replace "or be an" with --or can be an--

Column 10, line 49 – Replace "is represented" with --are represented--

Column 12, line 21 – Replace "416 and 418" with --416 or 418--

Column 15, line 63 – Replace "Control Bios" with --Control BIOS--

Column 16, line 30 – Replace "an exemplarily" with --an exemplary--

Column 16, line 31 – Replace "one a various" with --one of various--

Signed and Sealed this  
Twenty-sixth Day of February, 2013

Teresa Stanek Rea  
*Acting Director of the United States Patent and Trademark Office*